(12) United States Patent
Manos et al.

(10) Patent No.: US 8,107,419 B2
(45) Date of Patent: Jan. 31, 2012

(54) METHOD AND SYSTEM FOR IMPROVING BANDWIDTH UTILIZATION OVER A FIXED NETWORK

(75) Inventors: Hezi Manos, Givatayim (IL); Shay Bakfan, Netanya (IL)

(73) Assignee: Celtro Ltd, Petach Tikva (IL)

( * ) Notice: Subject to any disclaimer, the term of this patent is extended or adjusted under 35 U.S.C. 154(b) by 980 days.

(21) Appl. No.: 12/030,516

(22) Filed: Feb. 13, 2008

(65) Prior Publication Data
US 2008/0198783 A1    Aug. 21, 2008

Related U.S. Application Data

(60) Provisional application No. 60/890,513, filed on Feb. 19, 2007.

(51) Int. Cl.
H04W 4/00    (2009.01)
H04J 3/24    (2006.01)
G06F 15/16   (2006.01)

(52) U.S. Cl. ........ 370/328; 370/474; 370/477; 709/231; 709/236

(58) Field of Classification Search .................. 370/328
See application file for complete search history.

(56) References Cited

U.S. PATENT DOCUMENTS

| | | | |
|---|---|---|---|
| 4,739,398 A * | 4/1988 | Thomas et al. | 725/22 |
| 6,201,834 B1 * | 3/2001 | Zhu | 375/240.27 |
| 6,970,476 B1 * | 11/2005 | Jonsson et al. | 370/401 |
| 7,072,296 B2 | 7/2006 | Turner | |
| 7,599,371 B1 * | 10/2009 | Brainos et al. | 370/392 |
| 7,634,582 B2 * | 12/2009 | Ovadia | 709/249 |
| 2001/0040885 A1 * | 11/2001 | Jonas et al. | 370/352 |
| 2004/0077345 A1 * | 4/2004 | Turner et al. | 455/423 |
| 2005/0063347 A1 | 3/2005 | Sarkkinen et al. | |
| 2005/0207430 A1 * | 9/2005 | Yamada | 370/401 |

OTHER PUBLICATIONS

Zhongping Zhang, Franz Heiser, Jürgen Lerzer and Helmut Leuschner, Advanced baseband technology in third-generation radio base stations, Ericsson Review No. 1, 2003, pp. 32-41.
Kenichi Ito, Tomonori Kumagai, Kenichi Harada, Takashi Sonobe, Tetsuo Tomita, Eiji Ikeda, Radio Network Control System, FUJITSU Sci. Tech. J., 38,2, p. 174-182(Dec. 2002).

* cited by examiner

*Primary Examiner* — Jeffrey Pwu
*Assistant Examiner* — Jasmine Myers
(74) *Attorney, Agent, or Firm* — Smith Risley Tempel Santos LLC; Gregory Scott Smith

(57) ABSTRACT

Bandwidth utilization over bearers in a fixed cellular network is improved by reducing the amount of data required to be transported. At each side of the bearer, data blocks (such as Iub blocks) are received and, prior to transmitting them across the bearer, they are analyzed to determine if they can be modified in such a manner to decrease the amount of data. On the other end of the bearer, received blocks are analyzed to determine if they have been modified, and if so, the blocks are reconstructed to a format that may not be identical to the original format but, that is operationally equivalent from a user perspective. The modifications to the blocks can be based on the type of data being transmitted. For instance, if the data is for a video session or and audio session, the modifications can be different. Information regarding the reconstruction of the blocks can be sent to the other end of the bearer as a part of the data or through other channels.

19 Claims, 6 Drawing Sheets

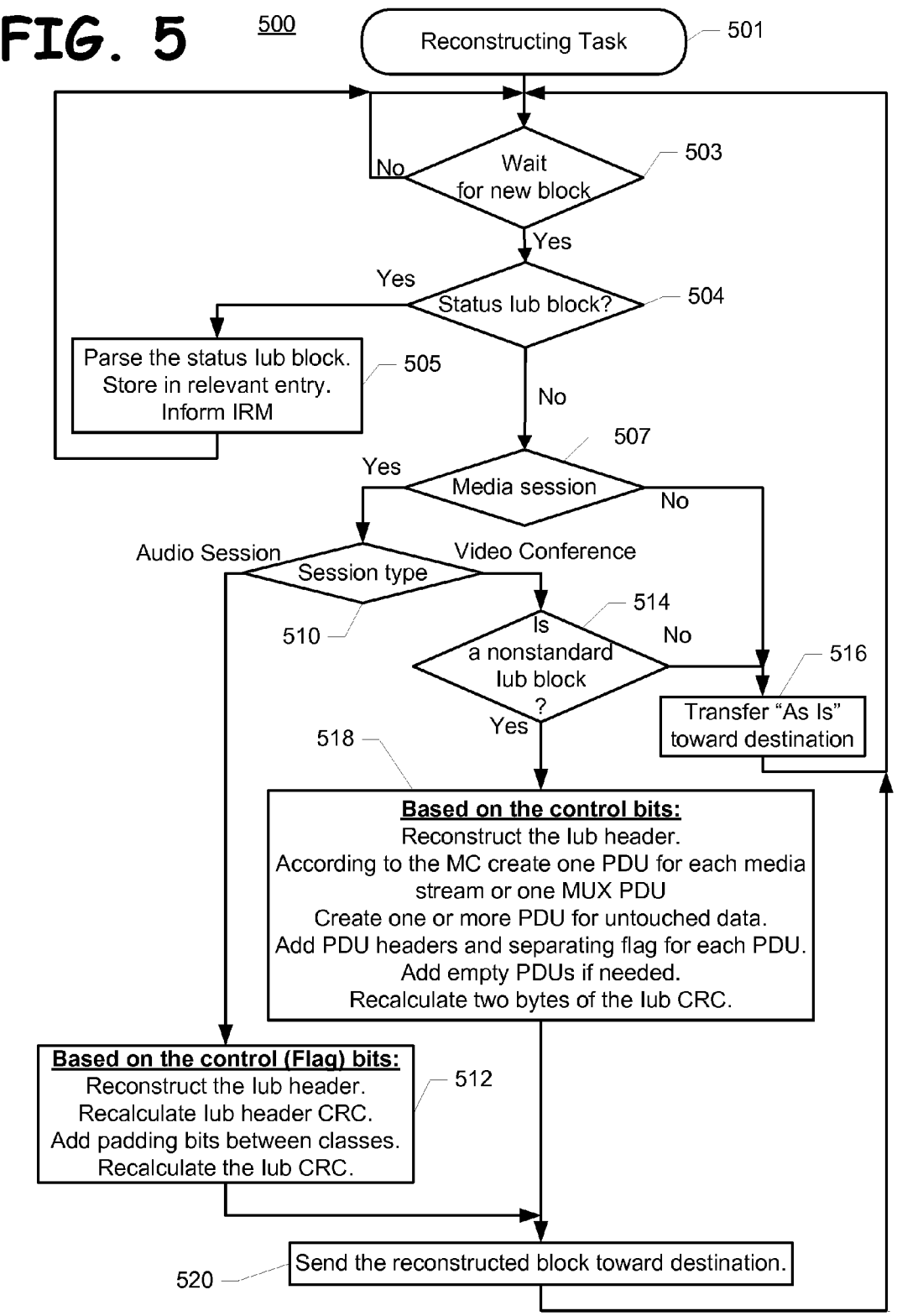

METHOD AND SYSTEM FOR IMPROVING BANDWIDTH UTILIZATION OVER A FIXED NETWORK

CROSS-REFERENCE TO RELATED APPLICATIONS

This application is a non-provisional application being filed electronically under 37 CFR 1.53(b) and claiming priority to U.S. Provisional Application for patent filed on Feb. 19, 2007 and assigned Ser. No. 60/890,513, the contents of which are hereby incorporated by reference.

BACKGROUND OF THE INVENTION

The subject matter of the present disclosure relates to the field of cellular fixed networks and, more specifically, to providing improved bandwidth utilization over a Universal Mobile Telecommunication System (UMTS) terrestrial radio access network (UTRAN).

The rapid evolution of video communication over wireless communication networks for mobile communications, such as but not limited to, 3G networks, etc. creates a demand for increasing bandwidth of the cellular networks. The demand for increasing the bandwidth of the cellular network pushes more and more cellular network operators to adapt a UMTS network architecture. The UMTS network architecture enables network operators to enjoy the improved cost-efficiency of UMTS while protecting their 2G investments.

The UMTS architecture includes a new radio access network, UMTS terrestrial radio access network (UTRAN) that interfaces between a plurality of mobile terminals (MT) and a core network of a cellular operator. A common UTRAN can comprise one or more radio network controllers (RNC). Each RNC can be connected to a plurality of nodes (i.e. node B). Each node B connects with a plurality of MTs via a radio interface.

The interface between the UTRAN and the GSM Phase 2+ core network (CN) is called Iu (the interface between an RNC and a CN). The Iu is divided into two types of interfaces. The first type is the interface between the RNC and the packet-switched domain of the CN and is called Iu-PS. The Iu-PS is used for packet-switched data. The second type is the interface between the RNC and the circuit-switched domain of the CN and is called Iu-CS. The Iu-CS is used for circuit-switched data. The interface between the RNC and a node B is referred as Iub and the interface between an RNC and another RNC is referred as Iur. The Iu, Iub, and Iur interfaces can be used over a connection using ATM transmission protocol. More information about UMTS is disclosed in UMTS release 1 (Rel. '99), the content of which is incorporated herein by reference.

In the Iub interface, between an RNC and a node B, the data is organized in Iub blocks. A common Iub block starts with an Iub header, which is followed by the data and is typically terminated with two bytes of Iub Cyclic Redundancy Check (CRC). The length of an Iub block can be varied and may depend on the type of session to which it belongs (audio session, video conferencing session, data session, etc.). For example, consider an Iub block that carries video conferencing data, which is multiplexed according to the H.223 protocol. The data may be organized in one or more H.223 protocol data units (PDU). Each PDU starts with a header and can be followed by a flag.

A PDU can carry a single type of content (control or audio or video, for example) or a mix of types of content, audio data followed by video data or video data followed by audio data, for example. The content type of a PDU is defined by a multiplexing code (MC). The MC is a field in the header of the PDU. The MC defines an entry in a multiplex table. The multiplexing table can be sent within the control information that is sent while establishing the connection with the moving terminal. Each entry in the multiplexing table defines the type of the content that is carried by the PDU. Usually, when MC is zero, the PDU carries signaling and control information. Other values of MC can be used to mark PDUs that carry audio data, another MC may define PDUs that carry video data, another MC may define PDUs that carry video data followed by audio data, and alternatively another MC may define PDUs that carry audio data followed by video data.

The packaging format of an Iub block includes an overhead of a plurality of bytes that are used as flags, headers, CRC, etc. Some of this overhead is needed for other sections of the connection, for example for the air interface between an MT and a node B and may not be needed over a terrestrial connection.

Therefore, there is a need for a system and method for reducing the overhead bytes in the Iub blocks. The system can remove some of the flags, headers, etc. Such a system can improve bandwidth utilization over the communication line between an RNC and the plurality of node Bs.

Furthermore, from time to time there is a need to give priorities to certain types of communication over other types to provide a desired quality of service (QoS). For example, in case that a connection between a node B and an RNC is overloaded, then video data can be removed from the connection releasing bandwidth for carrying audio session data. Therefore, there is a need for a system that can distinguish between video data and audio data that is carried by an Iub and that is capable of removing the video data in order to release bandwidth or reduce bandwidth consumption.

BRIEF SUMMARY OF THE INVENTION

Exemplary embodiments of the present invention seek to provide a novel apparatus and improved methods for reducing the number of bytes that are transmitted over a bearer between a central node, and an intermediate node. A pair of connection analyzer and reorganized modules (CAR) can be installed at each side of the bearer. An exemplary embodiment of a CAR can comprise a transmitting section and a reconstructing section. An exemplary transmitting section can handle the data transportation that travels toward the bearer while the reconstructing section can handle the data transportation that travels from the bearer toward the intermediate node or the central node. The central node can be an RNC and the intermediate node can be node B, for example.

In this application the terms "communication line" and "bearer" are used interchangeably. Henceforth, the description of the present invention may use the term 'bearer' as a representative term for any of the above group. The bearer can include a plurality of channels and each channel can be associated with a certain connection between an MT and an RNC. The data transportation over the bearer can be divided into data chunks. The data chunks can be referred as blocks, packets, cells, frames, etc. In the description, the terms connection and channel can be used interchangeably.

An exemplary transmitting section is capable of intercepting the data transportation over the bearer and to learn the behavioral pattern of each channel (session) that is carried over the bearer. Further the exemplary transmitting section identifies the session timing type (start, end) and the content of the payload that is carried by one or more of the channels. In addition, the exemplary transmitting section reorganizes the data, over the channels that their content has been identified, in more efficient format and transfers the reorganized data chunk toward the reconstructing section in a mating CAR on the other end of the bearer. On the other side of the connection line, in the mating CAR, an exemplary reconstructing section is capable of reconstructing the reorganized chunk of data into a legal format of a data chunk that matches the type of the session and the content of the payload. The original received data chunk, at the transmitting module may be different from the reconstructed data chunk at the output of the reconstructing module; however, both chunks create similar user experience.

In a UTRAN fix network, for example, the two CARs can be installed over a communication line between an RNC and a node B, one for each side of the bearer. The communication line can be based on the ATM protocol, for example. The exemplary CAR can be adapted to reorganize Iub blocks in more efficient format and transfer the reorganized blocks toward its mating CAR on the other side of the connection. The reorganized chunks of data can be sent over the ATM communication link according to a communication protocol other than the Iub interface. For example, the reorganized chunks can be sent, between the two CARs, above the ATM bearer by using a proprietary point-to-point protocol or any other communication protocol that can be used for data communication between two computers. Exemplary protocols can be the Internet Protocol (IP), the Ethernet, etc.

An exemplary transmitting section can be adapted to determine when a session has been started or ended and/or to analyze the type of transportation that is carried over each one of the plurality of channels of the bearer. Based on this analysis, a decision can be made whether a channel is associated with a video conference session, an audio session or any other session, for example. If a channel is associated with a video conferencing data, then one or more multiplexing codes that are relevant to the channel can be identified. In some cases the multiplexing table may be delivered. In other cases, the MC can be determined by further analyzing of the transportation that is carried by the channel. After defining the multiplexing code, an exemplary transmitting module may reorganize the received block by eliminating empty PDUs, arranging the data according to their type, etc. Other exemplary embodiments of the present invention may analyze the signaling and control channels to determine the session type and the MC.

A reorganized chunk of data can include a modified Iub header, a chunk of audio data followed by a chunk of video data, or vice-versa. At the end of the reorganized chunk, untouched data can be written. The untouched data is a data type that is transferred as is. For example, control PDUs can be transferred as is. The new format is more efficient than the Iub format since it eliminates some of the overhead bytes, such as but not limited to, PDU headers, flags that separate between PDUs, and some of the CRC bytes.

Some exemplary embodiment of the present invention may implement QoS decisions. For example, if the bearer is loaded, video data of a received Iub can be removed while transferring just the audio data. Such a decision may affect the video session but enables the conversation to continue using audio data only. Other embodiments of the present invention may eliminate video data of inter-frame while transferring the video data of an intra-frame. In such a session, the quality of the video image is reduced, however the session continues.

When the transmitting module determines that a channel carries transportation of an audio session, a decision can be made about the bit rate that is used by the AMR codec. Based on the bit rate, an exemplary transmitting module may reorganize the received block by eliminating bits that do not include audio information and the reconstructing module and reconstruct received block. For example, the Iub header can be modified, the padding bits between classes (A, B and C) of AMR encoded data can be removed, and the CRC bytes at the end of the Iub block can be removed.

Information that may be needed to reconstruct the packet of a channel can be sent to the mating CAR on the other side of the connection. The information may include the session type, the MC for a video conferencing session, etc. The information can be sent in band, in certain fields of the first reorganized block, for example. Other embodiments of the present invention may send a status Iub block having a payload of one byte. The one byte can be used as a flag. An exemplary status Iub block can be a byte with the value 15 (0F), for example. Such a status Iub block can indicate the end of session. In some embodiments a status Iub block of one byte can indicate that the following one or more Iub blocks (a configurable number) carries information that is needed for reconstructing the following non-standard Iub blocks, etc. In other exemplary embodiments of the present invention, the information can be sent out of band, for example over an IP connection between the pair of CARs.

On the other end of the connection, an exemplary reconstructing section of the mating CAR may reconstruct the non-standard Iub block into a standard Iub block. For example, if a channel carries video conferencing data, then the Iub header is reconstructed and one or more PDUs can be created according to the multiplexing pattern that is used over the original channel. If the original Iub block includes one or more untouched PDUs, then those PDUs can be added after the PDUs that carry the media. Empty PDUs can be added to match the length of the reconstructed Iub to the desired length and two CRC bytes can be calculated and added at the end of the Iub. The reconstructed Iub is transferred toward its destination. If video data was removed due to QoS decisions, an exemplary reconstructing module may add empty PDUs instead.

If a channel carries audio data, then the bit rate can be determined based on the length of the received non-standard Iub block, the Iub header can be reconstructed, padding bits can be added to separate between classes of AMR codec, and two bytes of CRC can be calculated. Then, the reconstructed Iub is transferred toward its destination.

For channels bearing content that cannot be identified, the date is not manipulated by an exemplary CAR and the data may travel as is over the bearer. Other exemplary embodiments may include additional processes for further compressing the data. For example an alternate exemplary embodiment of the present invention may further compress media data according to one or more of the methods that were disclosed in U.S. patent application Ser. No. 11/408,418 the content of which is incorporated herein by reference.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE SEVERAL VIEWS OF THE DRAWING

Exemplary embodiments of the present invention will be understood and appreciated more fully from the following detailed description, taken in conjunction with the drawings in which:

FIG. 5 is a flow diagram showing relevant steps of an exemplary embodiment of a task for reconstructing the data transportation.

DETAILED DESCRIPTION OF THE INVENTION

Figure 1:
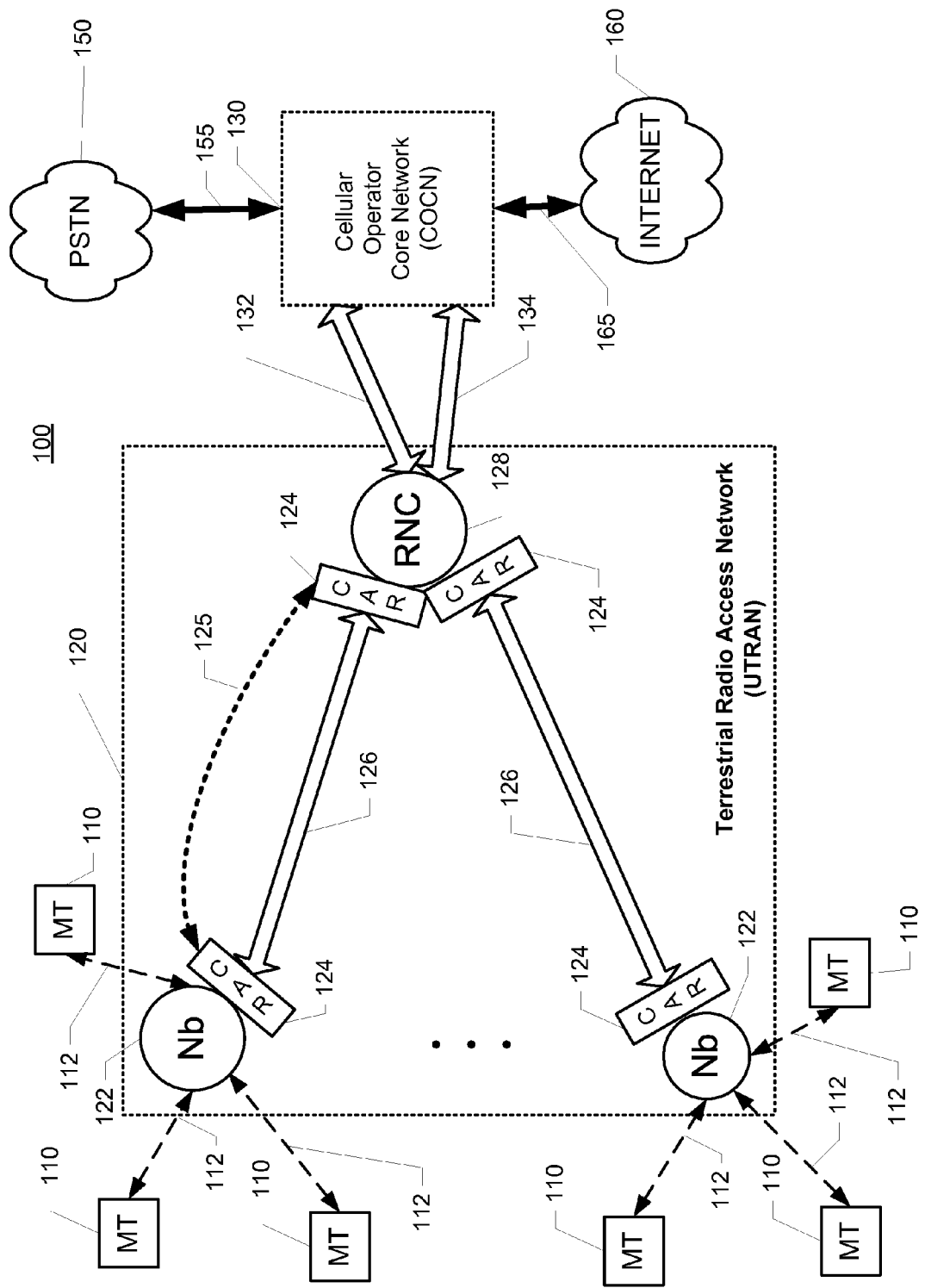
FIG. 1 is a simplified block diagram illustrating an exemplary portion of a communication network in which an exemplary embodiment of the present invention is used.

The disclosure can be further understood with reference to the drawings. In the drawings, like numerals represent like elements throughout the several views. For convenience, only some elements of the same group may be labeled. The drawings illustrate examples of the disclosed embodiments and are not intended to limit the disclosure in any way. Therefore, features shown in the drawings are chosen for convenience and clarity of presentation only.

FIG. 1 illustrates a block diagram with relevant elements of a portion of an exemplary cellular network 100, utilizing an exemplary embodiment of the present invention. The exemplary cellular network 100 is a 3G Cellular network, and may comprise a plurality of mobiles terminals (MT) 110 wirelessly connected 112 to a UMTS terrestrial radio access network (UTRAN) 120. The UTRAN 120 can be connected to a cellular operator's core network (COCN) 130 via a circuit switch connection 132 and via a packet switch connection 134. The COCN 130 can include common cellular network elements, such as a mobile switching center (MSC), serving GPRS support node (SGSN), gateway GPRS support node (GGSN), home location register (HLR) etc. which are not shown in the drawings. The COCN 130 can be connected via a circuit switch connection 155 to a Public Switched Telephone Networks (PSTN) 150 and via a packet switch connection 165 to the Internet 160. Exemplary MTs 110 can include a cellular phone, a PDA with cellular capabilities, or any other computerized device that can generate and/or receive audio, video data or any combination of those via a cellular network.

An exemplary UTRAN 120 may comprise a plurality of nodes (Node B or Nb) 122 and one or more Radio Network Controllers (RNC) 128. An Nb 122 is communicatively coupled to an RNC 128 via a bearer 126 using an Iub interface. Exemplary bearers 126 can carry data traffic based on the ATM protocol, for example. The RNC 128 is connected with the packet-switched domain of the COCN 130 via an ATM connection 134 using an Iu-PS interface and with the circuit-switched domain of the COCN 130 via an ATM connection 132 using Iu-CS interface. In order to increase the utilization and improve the QoS over the UTRAN 120, a pair of exemplary connection analyzer and reorganized modules (CAR) 124 can be installed at each side of each bearer 126 employed.

The node Nb 122 is an intermediate node for radio transmission/reception with the MTs 110 that are currently located in a geographical area that is served by the Nb 122. A single node Nb 122 can serve a plurality of MTs 110. The node Nb 122 can connect with an MT 110 via a wireless interface such as a W-CDMA radio interface 112, and can communicate with the RNC 128 via the Iub asynchronous transfer mode (ATM) based interface over connection 126. In the Iub interface the data is transferred in Iub blocks. In an ATM network, the node Nb can be an ATM termination point.

Among other tasks, the node Nb 122 converts data to and from the radio interface, including forward error correction (FEC), rate adaptation, W-CDMA spreading/despreading, and quadrature phase shift keying (QPSK) modulation on the air interface as required. The node Nb 122 measures quality and strength of the connection and determines the frame error rate (FER), transmitting this data to the RNC 128 as a measurement report for handover and macro diversity combining. The node Nb 122 is also responsible for the soft handover.

The RNC 128 controls the plurality of nodes Nb 122 and MTs 110, which are connected via the RNC 128. Among other tasks, the RNC 128 enables autonomous radio resource management (RRM) of the UTRAN 120. It can handle protocol exchanges between Iu-PS, Iu-CS, and Iub interfaces and is responsible for centralized operation and maintenance (O&M) of the UTRAN 120 elements. The RNC 128 can switch ATM cells between the different nodes Nb 122; to multiplex/demultiplex circuit-switched and packet-switched data that are coming from COCN 130 over Iu-CS interface 132 and Iu-PS interface 134 via Iub interface 126. More information on the 3G cellular network technology and operation can be found in relevant web sites such as www.3gpp.org, or different publications, such as but not limited to UMTS release 1 (Rel. '99), the content of which are incorporate herein by reference and are considered as known to those skilled in the art.

An exemplary CAR 124 can be capable of (1) intercepting the data transportation over the relevant bearer 126 at the Iub interface level; (2) learning the behavioral pattern of a current session on each channel that is carried over the bearer 126; (3) identifying the session timing (start, end), type and the content of the payload that is carried by one or more of the channels; (4) reorganizing the data into nonstandard Iub blocks, over the channels that their content has been identified and (5) transferring the reorganized nonstandard Iub blocks toward a mating CAR 124 on the other end of the bearer 126. The nonstandard format that is used to reorganizing the Iub blocks is a more efficient format than the standard Iub interface.

On the other side of bearer 126, in the mating CAR 124, an exemplary reconstructing section is capable of reconstructing the reorganized chunk of data into a legal format of an Iub block that matches the type of the session and the content of the payload. The originally received Iub block at the CAR 124, which is located at the access of bearer 126, can be different from the reconstructed Iub block at the output of the mating CAR 126. However, both Iub blocks can create a similar user experience.

A pair of CARs 124 can communicate with each other via connection 125. connection 125 can carry information that can be used by a reconstruction section of a mating CAR 124 in order to reconstruct the reorganized data blocks. This information may include, but is not limited to, information identifying the session type, timing of the session and the multiplexing code that is currently used over a certain channel in the bearer 126. This information can be send out of band or in band. For instance, the information can be based on the Internet Protocol (IP) and can be carried over one of the channels of the ATM bearer 126. Other exemplary embodiments may embed the information that is transferred between the two CARs into the reorganized nonstandard Iub blocks in dedicated fields. More information with regards to the operation of an exemplary CAR 124 is disclosed below in conjunction with the description of FIGS. 2, 3A, 3B, 4 and 5.

Figure 2:
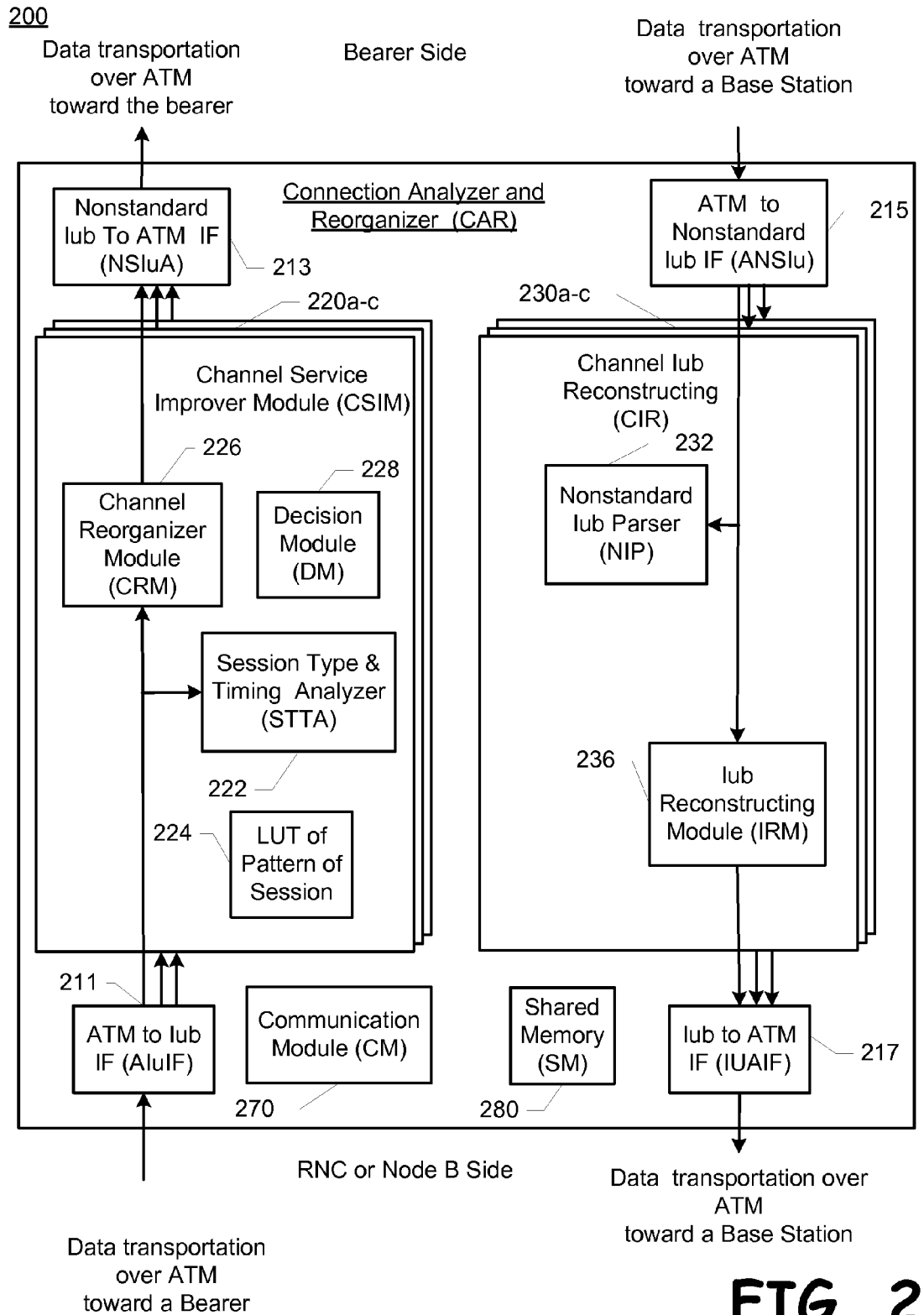
FIG. 2 schematically illustrates a block diagram with relevant modules of an exemplary Connection Analyzer and Reorganizer (CAR) that operates according to certain teachings of the present disclosure.

FIG. 2 illustrates a block diagram with relevant elements of an exemplary embodiment of a Connection Analyzer and Reorganized (CAR) module 200 that operates according to certain teachings of the present disclosure. The exemplary CAR 200 that is illustrated in FIG. 2 can be used in a junction between a node Nb 122 or an RNC 128 (FIG. 1) and its associated bearer 126 (FIG. 1) (e.g., note units 124 illustrated in FIG. 1). The CAR 200 may receive transportation or data between a node Nb 122 and its relevant bearer 126. Toward the bearer 126 CAR 200 is adapted to intercept the communication over the Iub interface of each channel and to analyze the session type and timing. Based on the result of this analysis, the data carried in the Iub blocks is reorganized into a nonstandard Iub format and is then sent toward the mating CAR 124 via bearer 126 (FIG. 1). In the other direction, nonstandard Iub blocks that are received via the bearer 126 are reconstructed according to a standard Iub interface and then transferred toward the node Nb 122 via an ATM connection.

In some embodiments of the present invention, the CAR 200 can be adapted to receive QoS decisions. A QoS decision can depend on the load over its associated bearer 126. Based on the QoS decisions, the CAR 200 can manipulate the data transportation in certain channels of the ATM bearer 126. For example, the CAR 200 can operate to remove video data.

Looking at an exemplary CAR 200 in more detail, the CAR 200 can be described as being divided into two sections: (1) a transmitting section and (2) a receiving section. The two sections can be served by a single communication module 270 and a shared memory 280. The transmitting section may comprise a network interface, such as an ATM to Iub IF Module (AIuIF) 211, at least one channel service improver module (CSIM) 220*a-c* (one per each active connection) and a network interface such as a nonstandard Iub to ATM interface module (NSIuA) 213. In the other direction, a receiving section of the CAR 200 may comprise a network interface, such as an ATM to nonstandard Iub IF (ANSIu) module 215, at least one channel Iub reconstructing module (CIR) 230*a-c* (one per each active connection, for example) and a network interface such as an Iub to ATM interface module (IuAIF) 217.

An exemplary CSIM 220*a-c* can comprise a session type and timing analyzer module (STTA) 222, an LUT 224 storing patterns and/or parameters of different types of sessions (patterns and/or parameters of video conferencing sessions, audio sessions with different bit rates, signaling and controls, etc.), a channel reorganizer module (CRM) 226 and a decision module (DM) 228. An exemplary CIR 230*a-c* can comprise a Nonstandard Iub parser (NIP) 232 and an Iub reconstructing module (IRM) 236.

The SM 280 can be used for storing information that is shared and can be used by the different modules of CAR 200. Information such as, but not limited to, a connections table, queues of the different modules, etc. The connections table can include a plurality of entries. Each entry can be associated with a CSIM 220*a-c* and contains a CID that is related to the CSIM 220*a-c*, and status information that is related to the current connection (session) that is handled by the relevant CSIM 220*a-c*. As a non-limiting example, fields in an entry can include: session type (audio, video or other), bit rate of the compressed video, MC value, the order of the different media in each video data PDUs, quality of service (QoS) indication, etc. Some of the fields, which are related to the content of the session are updated by STTA 222 and are used by DM 228 and CRM 226. Some of the fields that are related to management decisions can be updated by DM 228 and can be used by CRM 226. For example, QoS information, load information, etc.

The first pair of ATM interfaces, AIuIF 211 and NSIuA 213, is associated with the transportation toward the bearer 126 (FIG. 1), while the second pair of ATM interfaces, ANSIu 215 and IuAIF 217, is associated with the transportation from the bearer 126 toward the node Nb 122 or the RNC 128. An exemplary AIuIF 211 can get the transportation that is transferred over an ATM network from a node Nb 122 or the RNC 128 to the relevant bearer 126. The AIuIF 211 receives ATM cells and processes the received cells according to the ATM communication protocol and organizes the data that is stored in the payload of the ATM cell into Iub blocks, according to the Iub interface standard. Based on the associated channel ID (CID), which is embedded within the header of the cell, the Iub block is transferred to the CSIM 220 that is associated with the relevant CID. Transferring the Iub block can be done by storing the data of the Iub block into the SM 280 and placing a pointer to the address in the SM in a queue that is associated to the relevant CSIM 220.

Nonstandard Iub blocks received from the one or more CSIMs 220*a-c* are transferred to NSIuA 213. Transferring the nonstandard Iub block can be done by storing the data of the nonstandard Iub block and the relevant CID into the SM 280 and placing a pointer to the address in the SM in a queue that is associated with NSIuA 213. The NSIuA 213 divides the data of the nonstandard Iub blocks into one or more payloads of ATM cells according to ATM standard; adds the appropriate CID to the cell and sends the cell over bearer 126 (FIG. 1) toward the mating CAR 124 on the other side of the connection.

An exemplary ANSIu 215 can get the transportation that is transferred from a mating CAR 124 via bearer 126. The ANSIu 215 receives the ATM cells, processes the received cells according to the ATM communication protocol, and organizes the data that is stored in the payload of the ATM cell into nonstandard Iub blocks based on the associated channel ID (CID). The Iub block is transferred to the CIR 230 that is associated with the relevant CID. Transferring the Iub block can be done by storing the data of the Iub block into the SM 280 and placing a pointer to the address in the SM 280 in a queue that is associated with the relevant CIR 230.

Reconstructed standard Iub blocks from the one or more CIR 230 are transferred to the IuAIF 217. Transferring the reconstructed standard Iub block can be done by storing the data of the reconstructed Iub block and the relevant CID into the SM 280 and placing a pointer to the address in the SM into a queue that is associated with IuAIF 217. The IuAIF 217 divides the data of the reconstructed Iub blocks into one or more payloads of ATM cells according to the ATM standard; adds the appropriate CID to the cell and sends the cell toward its associated node Nb 122 or RNC 128 (FIG. 1).

Other exemplary embodiments of the present invention may use methods other than using the SM 280 for transferring data chunks between different modules of the CAR 200. For example, each module may have its own buffer and the information for a particular module may be sent directly to the one or more buffers associated with that module via an internal bus, such as but not limited to a TDM bus, Ethernet, etc.

The CM 270 is the interface module between the CAR 200 and its mating CAR on the other end of the bearer 126 and/or with the different modules of the COCN 130 (FIG. 1). The communication that is handled by the CM 270 can include control, signaling and status signals, but it does not include cellular transportation. The communications sent via the CM 270 may be conducted over a network such as, but not limited to, a LAN, WAN, Internet, etc. In other embodiments, the communications can be performed either in band or out band. The communication between the CARs 200 can be carried via link 125 (FIG. 1) or over bearers 126 depending on the particular embodiment or even upon operational factors. In an exemplary embodiment of the present invention in which the transportation between a first and second CAR is done over bearer 126, the network interface modules 211, 213, 215 and 217 can be modified to transfer/receive relevant cells toward/from the CM 270 to the other end of bearer 126.

At this point the reader is directed to the channel service improver module (CSIM) 220*a-c* illustrated in FIG. 2. In an embodiment of the present invention an instance of a CSIM 220*a-c* can be created or initiated by an AIuIF 211 upon the reception of a cell that belongs to a new CID. Once a CSIM is created, it typically will exist as long as the connection is active. When the connection becomes inactive, the resources of the relevant CSIM 220*a-c* can be released.

In an alternate embodiment of the present invention, a CAR 200 can include a bank of active CSIMs 220*a-c*. Each CSIM can be associated with a CID. In such embodiments, when an Iub block that belongs to a certain CID is received, the Iub block is transferred to the appropriate CSIM 220.

Each particular CSIM 220*a-c* operates to improve the service over its associated channel. An exemplary CSIM 220*a-c* can include a session type and timing analyzer module (STTS) 222, a LUT 224 storing patterns and/or parameters of different type of sessions, a channel reorganizer module (CRM) 226 and a decision module (DM) 228. An exemplary STTA 222 can examine the data transportation over the channel by comparing parameters of received Iub blocks to different patterns that are stored in LUT 224. A pattern can include parameters such as, but not limited to, size of the Iub block, repetition rate, certain combination of bytes, etc.

For, example, it can be determined from empirical observation, that an Iub block carrying video conference data based on multiplexing protocol H.223 has 165 bytes when it is sent downlink toward a node Nb 122 and has 167 bytes when it is sent uplink from a node Nb 122 toward an RNC 128 (FIG. 1). Furthermore, video data of a video conferencing session carries certain combinations of bytes. For example, a video stream that was compressed according to a compression standard such as, but not limited to, ITU H.263 starts with an H.263 header. The H.263 header starts with a combination of 3 consecutive bytes (0, 0, 128). Additional parameters that can be used to identify the session type can be the repetition rate. Common Iub blocks of a video session can be received every 20 msec. Therefore, a pattern of several consecutive Iub blocks having 165/167 bytes (uplink/downlink respectively), with repetition rate around 20 msec and wherein at least one of the Iub blocks includes the combination of (0, 0, 128) can indicate, with high probability, that the current session over the channel is a video conferencing session. The above parameters can be stored in LUT 224.

It is also ascertainable that the behavior of an audio session, which is compressed according to AMR for example, depends on the bit rate that is used by the AMR codec as it is illustrated in table 1. The information of table 1 can be stored in LUT 224.

TABLE 1

The size of an audio frame as a function of bit rate.

| Bit rate Kbps (K bits per second) | Number of bytes in Iub blocks of audio session traveling Downlink | Number of bytes in Iub blocks of audio session traveling Uplink | Core Size of an audio frame |
|---|---|---|---|
| 4.75 | 20 | 22 | 13 |
| 5.15 | 21 | 23 | 14 |
| 5.90 | 22 | 24 | 15 |
| 6.70 | 25 | 27 | 18 |
| 7.40 | 26 | 28 | 19 |
| 7.95 | 28 | 30 | 21 |
| 10.2 | 34 | 36 | 27 |
| 12.2 | 39 | 41 | 32 |
| Silence ID (SID) Frame | 12 | 14 | 5 |

A core of a frame is split into 3 classes according the importance level of the bits: Class A, Class B and Class C. At the air interface, error protection is added to Class A bits. The division into classes is not necessarily on byte boundaries, and as such padding bits may be added between the classes.

A common rate of Iub blocks that carry audio session data can be 20 msec. However, in some cellular networks, during silence periods the channel is idle. Therefore, the Iub blocks that carry audio data can be received in bursts. A burst can be associated with a speaking period of the user. The rates of Iub blocks within a burst can be 20 msec.

An exemplary STTA 222 can be configured to examine the size and the rate of a group of few consecutive Iub blocks. A group can have five to ten Iub blocks, for example. The size and the rate can be compared to parameters in the LUT 224 in order to reach a coarse decision whether the channel carries videoconferencing data, audio session data or other type of data. Video transportation can be further analyzed in order to define the multiplexing code (MC). A common Iub block of video conferencing session carries multiplexing data: audio, video and signaling.

The MC is a field in the header of a PDU. The MC defines an entry in a multiplex table, which defines the type of the content that is carried by the PDU. Usually, when MC is zero, the PDU carries signaling and control information. Other values of MC can be used to mark PDUs that carry audio data only, another MC may define PDUs that carry video data only, another MC may define PDUs that carry video data followed by audio data, and alternatively another MC may define PDUs that carry audio data followed by video data. In order to determine the MC combination that is currently used over its associated channel, an exemplary STTA 222 may parse the Iub blocks of videoconference session, retrieve the MC values and determine whether there is a single value of MC, which is other than zero, or two values are used.

If a single value, other than zero, is used, it can be assumed that a PDU having the single MC carries multiplexing audio and video data. Then, the order between the two, audio followed by video (A/V) or vice versa video followed by audio (V/A) has to be defined. The order, A/V or V/A, can be defined by further analyzing the payload of the PDU searching for a certain combination of bytes that are unique to video data. For example, a string of three consecutive bytes having the value of (0,0,128) can point the starting bytes of an H.263 compressed video frame. If the string appears in the middle of the PDU, then it can be assumed that the PDU carries audio followed by video, an A/V PDU. The bytes between the end of the PDU header and the starting string of the video header can be assumed as audio string and the size of the audio string can be calculated. The number of bytes is compared to the possible sizes of core frame of AMR audio that is stored in LUT 224 and is described in the last column of table 1. If the number of bytes match an entry in the table it indicates that the string is an audio string and based on the entry the bit rate can be defined. The MC value and the AMR bit rate can be transferred to DM 228.

If the starting string (0,0,128) of a video frame header is located at the beginning of the PDU, after the PDU header, then the tail of the PDU is analyzed in order to define the beginning of an audio frame. An exemplary embodiment may compare different portions of the tail of the PDU. Each portion of the tail can match a size of one of the possible options of audio frames according to the bit rate of the AMR codec (based on table 1, which is stored in LUT 224). The decision on the bit rate can based on searching the padding bits (zero) in the appropriate location that matches the location of padding bits in the current checked option of AMR frame. The process may start with the higher bit rate 12.2 Kbps of an AMR codec, for example. If a match of the location of the padding bits is not found, the process may continue to the next bit rate in the table. The process may continue until a match is found or a decision is made that the tail does not include an audio frame, which was compressed according to the AMR standard.

For checking the possibility of an audio frame that was compressed according the AMR at a bit rate of 12.2 Kbps, a tail in length of 32 bytes (last column of table 1) can be parsed by STTA 222. A common audio frame of 12.2 Kbps includes a string of 32 bytes having 81 bits of class 'A' data followed by seven padding bits followed by 103 bits of class 'B' data followed by a single padding bit followed by 60 bits of class 'C' data and terminated with 4 padding bits. The padding bit has a value of zero. If the string of 32 bytes does not have zero bits in the location of the padding bits, the second option (AMR codec using 10.2 Kbps) can be checked. A tail in the sizes of 27 bytes (last column of table 1) is parsed. The string of 27 bytes is supposed to include 65 bits of class 'A' data followed by 7 padding bits followed by 99 bits of class 'B' data followed by a 5 padding bit followed by 40 bits of class 'C' data and terminated without padding bits. If the string of 27 bytes does not have zero bits in the location of the padding bits, the next option can be checked, etc.

Other exemplary embodiments of the STTA 222 may use parallel processes. Such an STTA 222 may initiate a plurality of threads, with each thread able to parse a different size (according to table 1) of the tail of the PDU looking for zero bits (padding) in the appropriate locations per each size of tail (according to the AMR standard). If a match is found by one of the threads, then it can be assumed that the tail carries audio frame encoded according to AMR in the appropriate bit rate.

If a match can not be found or two matches were found indicating that an audio frame can not be defined, then the type of the session can be changed from video conference to unknown or other.

When there are two MCs other than zero, each one is associated with another PDU, then STTA 222 has to determine which one of them is associated with video data. An exemplary STTA 222 may search the starting string (0,0,128) of a video header in each PDU. If the associated PDU of the MC includes the video starting string, then the MC can be defined as an MC that is associated with video data. Then PDUs with the second MC can be parsed in order to check whether the data payloads comply with one of the patterns of the AMR (size and padding bits) as it is disclosed above.

At the end of its analyzing, STTA 222 may deliver to the DM 228 and the CRM 226 (directly or via DM 228 information about the session. The information about the session can define the type of the session: audio conversation, videoconference session, other or unknown session. In addition to the type of session information on the bit rate that is used by the AMR codec can be delivered too. When the session is a videoconference, information on the MC can also be delivered. After delivering the information about the session, STTA 222 may enter to another mode of operation in which it continues analyzing the transportation in order to define the termination of a session or changing in the session.

During the second mode of operation, each Iub block can be checked to verify that it matches the pattern of the type that has been defined. The pattern can include, size, padding bits, special strings, etc. as it is disclosed above. In addition a timer can be used in order to define or identify the end of the connection. An exemplary timer can be set to a few seconds for audio sessions and 400 msec for videoconference sessions. When a decision is made that the session has been terminated, a session termination indication can be delivered to the DM 228 and the STTA 222 may return to the first mode of operation for analyzing the type of the following session.

Other exemplary embodiment of the STTA 222 may use several layers of analysis. An exemplary STTA 222 may further analyze traffic that was defined as videoconference data in order to verify the decision. Such an embodiment of the present invention may continue and compare certain bits in the header of the video frame to known values. For example the "split screen indicator" bit should be zero; or "document camera indicator" bit should be equal zero, etc. A more thorough definition of H.263 compression standard and H.223 can be found in the International Telecommunication Union ("ITU") standards, which can be found at the ITU website www.itu.int.

Another embodiment of the STTA 222 may get the type of the session carried by a channel and the MC by analyzing the signaling and control information that is relevant to its associated channel. Other embodiments may get the type of the traffic and MC from the RNC 128 via the CM 270. Other embodiments of the STTA 222 may use a combination of two or more of any of the above methods. Some embodiments of the present invention may implement some of the methods that are disclosed in U.S. patent application Ser. No. 11/464, 204 the content of which is incorporate herein by reference.

The decision about the type of the session and the MC is transferred to the DM 228. An exemplary DM 228 can be a logical module that controls the operation of its CSIM 220 and its mating CIR 230 on the other side of the connection, which is located at the mating CAR 124 (FIG. 1) over the other side of bearer 126. In addition to the decisions of the STTA 222, the DM 228 may receive relevant information from the COCN 130 (FIG. 1). The information can include indications on the load over bearer 126, QoS indications, etc. Based on the received information the DM 228 may reach decisions with regards to how to manipulate the transportation over its associated channel and accordingly instructs the CRM 226. The decision with information on the type of the content, the MC definition (if it exists), the AMR bit rate, etc. can be transferred to the CRM 226. In parallel, the information can be sent to the mating NIP 232 on the other side of the bearer. The communication with the NIP 232 can be done in band or out of band as it is disclosed above.

In other exemplary embodiments of the present invention, the DM 228 may not communicate or control the mating CIR 230 on the other side of bearer 126. Instead, the control information is embedded within each reorganized Iub block replacing certain bits in the Iub header as it is disclosed below in conjunction with CRM 226, the non standard Iub format may define those bits.

Yet in an alternate exemplary embodiment of the present invention, information on the type of session is not transferred to the mating CIR 230. Instead, the NIP 232 may run a similar process as the STTA 222 in order to define the type of the session and the bit rate.

Following are few exemplary decisions that can be performed by the DM 228. If the load over the relevant bearer 126 (FIG. 1) is below a certain level or the type of content that is currently carried by the relevant channel (CSIM) is unknown, or is signaling and control, then the CRM 226 and the mating NIP 232 can be instructed to transfer the Iub blocks as is without any modifications. If the load over the bearer exceeds a certain level and the type of the content (session) is audio data or video conferencing data, for example, then instructions may be given to the CRM 226 to reorganize the Iub block in a more efficient manner and relevant information can be sent to the mating NIP 232. Information about the type of content, bit rate, MC, etc.

According to the instructions that were received from the DM 228, the CRM 226 may transfer the received Iub blocks as is, or reorganized in more efficient way toward its mating CIR 230 on the other side of the connection via NSIuA 213. If a reorganize instruction with information on the type of the content is received from the DM 228, the CRM 226 may organize the Iub data in a nonstandard format. The CRM 226 may manipulate certain bits from the Iub header, certain flags, combine data from different PDUs, remove CRC bytes, remove empty PDUs, etc. Certain bits in the Iub header and/or the PDU headers can be modified in order to communicate control information to the mate NIP 232 and IRM 236 on the other side of the bearer.

When the channel carries video conferencing data, which is multiplexed according to the ITU protocol H.223, an Iub block may have the following structure: The Iub block starts with a header of 3 bytes (H0; H1; H2) then a sequence of PDUs, a flag of 2 bytes separates two consecutive PDUs, the IUB block terminates with 2 bytes of CRC. The total size of a common video conferencing Iub block at the downlink direction is 165 bytes, which include: 3 bytes of Header +160 bytes of payload +2 CRC bytes. At the uplink direction there are 2 additional bytes at the end of the block, the total size is always 167.

Each PDU consists of a PDU header of 3 bytes follows by the media data. The PDU header contains the media data type and the MC parameter. The data type can be audio, video or a combination of the two (A/V or V/A) and identifies the PDU length. Empty PDUs can be added to an IUB block. An empty PDU is a PDU with no payload. Empty PDUs include only the 3 header bytes (which are set to zero) followed by the separation flag (2 bytes).

An exemplary nonstandard Iub format that can be used by the CRM 226 can convert a standard Iub block carrying video conferencing data, which complies with H.223, into a nonstandard format having a nonstandard header of 3 bytes (H0'; H1'; H2'), followed by a chunk of bytes carrying data relevant to one media (audio or video) followed by another chunk of bytes carrying data relevant to the other media (video or audio respectively) followed by PDUs that carrying other data. The nonstandard Iub block is terminate without the CRC bytes. In the uplink direction, the two additional bytes can be added to the nonstandard Iub block. The first byte of each chunk of media defines the length of the chunk. Two bytes of the header H2' and H0' can carry the same information as the original bytes H2 and H0 (respectively). The second byte, H1, of the original header is modified into H1' in order to include information about the nonstandard Iub block.

An exemplary CRM 226 may modify the second byte H1' as follow: the least significant bit (LSB) is left at the value of zero for a standard Iub block and is set to one for a nonstandard Iub block (a reorganized one). The most significant bit (MSB or bit 8), of H1' can define the first chuck of data, bit 7 can define the second chunk and bit 6 may define the other data. The rest of the bits of H1' (5th, 4th, 3rd, and 2nd) remain as is and include the LSBs of a sequential number of the Iub.

Other exemplary embodiments may use other combinations or may use the first three bits after the header instead of modifying the second byte (H1) of the header, etc.

In order to reorganize an Iub block that carries video conferencing data in compliance with the above-provided example of a nonstandard format, an exemplary CRM 226 can be adapted to parse a received Iub block by using the information on the MC that was received from the DM 228 or the STTA 222 to retrieved the media data and organize it in two strings: an audio string and a video string. This is accomplished by adding one byte with the length of each string to the beginning of the string; creating one string by putting the video string after the audio, for example; and adding, if any exist, the one or more PDUs, which carry data other than media, to the end of the string.

A modification of the original Iub header is added to the head of the final string. An exemplary modified header can have the original H0 and H2 and a modified second byte, H1'. The LSB of H1' is set to one (indicating that the Iub is nonstandard); bit 8 (the MSB) can be set to one if the first string includes audio data; bit 7 can be set to one if the second string includes video data; bit 6 can be set to one if one or more PDUs carrying other types of data are included at the end of the string, or set to zero indicating that no other PDUs are added to the end of the string. For uplink traffic, the last two bytes that were embedded in the original Iub block, are copied to the end of the non-standard Iub block. At this point the nonstandard Iub block carrying video conferencing data is ready to be transferred to NSIuA 213 for being processed into ATM cells and to be transferred over the bearer toward the mating CIR 230. Other exemplary embodiments of the present invention may use other orders of streams. Alternate exemplary embodiments may add 2 bytes of CRC, etc.

During other communication sessions, a received instruction from the DM 228 may indicate that the data transportation belongs to an audio session encoded according to AMR at a certain bit rate (12.2 Kbps, for example) and that a reorganize action is needed. During such a session, the CRM 226 reorganizes the received Iub blocks more efficiently. An exemplary CRM 226 may manipulate certain bits from the Iub header, remove padding bits, remove CRC bytes, etc.

When the channel carries audio session data, an Iub block may have the following pattern: the Iub block based on AMR at a bit rate of 12.2 Kbps, for example, starts with a header of 5 bytes (H0; H1; H2; H3; H4) followed by 81 bits of class A data, followed by 7 bits of padding, followed by 103 bits of class B data, followed by 1 bits of padding, followed by 60 bits of class C data, followed by 4 bits of padding and terminated with two bytes of CRC. The total size of a common 12.2 Kbps compressed audio Iub block is 39 bytes. An Iub that carries other bit rates of audio data have other structures as it is explained above in conjunction with table 1.

The standard 5 bytes of the header carry the following information: Ho is a CRC byte of the header; and H1 is a sequence number (usually it is incremented by one from a previous Iub block). It is observable that the data of H2, H3, and H4 is not frequently changed, and if a change occurs it happens once in a while.

An exemplary CRM 226 can convert a standard Iub block carrying audio session data that complies with the AMR compression standard into a nonstandard format. In order to reorganize a received Iub block, the CRM 226 may store the header of the previous Iub and use it for making decisions regarding the manipulation of a current received Iub block. Exemplary CRM 226 add a flag with four bits to the beginning of the received Iub in front of H0. The four bits of the flag are used in association with the four last bytes of the original Iub header, bytes H1, H2, H3, & H4. Then the first byte (H0) of the header is removed. The second byte of the received header (H1) is compared to the stored second byte of the previous received header, if the difference is one (H1) reflects the sequence number), then the first bit of the flag is set to zero and H1 is removed. If the difference is other than one, then the first bit of the flag is set to one and the received H1 remains as is. Finally the last three bytes (H2, H3, & H4) are compared to corresponding bytes that are stored in memory. If the three bytes are the same as the stored three bytes then they are removed and the second bit of the flag is set to zero. If one of the received bytes is different from the corresponding stored byte, then the three bytes (H2, H3 & H4) remain as is and the second bit of the flag is set to one. The rest two bits are reserved bits and are set to zero. After handling the flag and the Iub header, the three classes of the audio data are added without the padding bits to create a continuous string of bits of the three classes. Then, the last two bytes of the CRC are removed. At the end of the continuous string, padding bits can be added in order to create an integer number of bytes.

At this point the nonstandard Iub block carrying audio session data is ready to be transferred to NSIuA 213 for being processed into ATM cells and being transferred over the bearer toward the mating CIR 230. An indication can be sent to the NIP 232 of the mating CIR 200 indicating that the following Iub blocks are nonstandard ones. In addition, information on the bit rate that is used for the session can be sent too. The indication can be sent in band or out of band as it is disclosed above.

Iub block carrying audio session data compressed in AMR at a bit rate other than 12.2 Kbps can be reorganized in nonstandard Iub block in a similar way as Iub blocks carrying 12.2 Kbps (as it is disclosed above) using the parameters of the relevant bit rate. The parameters of the relevant bit rate can be found in table 1.

Continuing with FIG. 2, the operation of an exemplary Channel Iub Reconstruction (CIR) module 230a-c on the other side of the connection is now presented. An exemplary CIR 230a-c receives the nonstandard Iub blocks coming from the mating CSIM 220a-c from the other side of bearer 126 via ANSIu 215. A CIR 230a-c can be created by an ANSIu 215 upon receiving an Iub block that belongs to a new channel. Once a CIR is created, it typically will exist as long as the connection is active. When the connection becomes inactive, the resources of the relevant CIR 230a-c can be released. In an alternate embodiment of the present invention, a CAR 200 can include a bank of active CIRs 230a-c. Each CIR can be associated with a CID. In such embodiments, when an Iub block that is carried over a channel having a certain CID is received, the Iub block is transferred to the appropriate CIR 230.

Each particular CIR 230a-c operates to reconstruct nonstandard Iub blocks into a standard format. The reconstructed Iub blocks can be different from the originally received Iub blocks at the entrance of the mating CAR 200 on the other side of bearer 126 (FIG. 1). However, the experience of the user will not be reduced. An exemplary CIR 230a-c can include a Nonstandard Iub parser (NIP) 232 and an Iub reconstructing module (IRM) 236. Other exemplary embodiments of the CIR 230a-c may include a receiving STTA 222 module (not shown in the drawing). The receiving STTA 222 module can be connected in parallel to an NIP 232. The receiving STTA can operate in a similar way to the STTA 222 in order to define the content of the session. The information about the content can be delivered to the NIP 232. In an alternate embodiment of the CIR 230, the NIP 232 may have some of the features of the STTA 222, which are used to define the type of session.

An exemplary NIP 232 can be adapted to manage the operation of the relevant CIR 230. It may receive an indication and control from its mating DM 228 residing on the other side of the bearer 126. The indications and control can include: a start or end of a session carried by the associated channel and the type of the content that is currently travelling via the associated channel. The content can be data of an audio session; of video conferencing session; or other type of data, for example. When the session is an audio session, information on the bit rate that is currently used can be added. When the session is a video conferencing session, information on the MC that is currently used in the original Iub blocks and the order of the two types of media, as well as the bit rate of the original audio data, can be added. In one embodiment of the present invention the communication with the mating DM 228 can be done out of band or in band as it is disclosed above.

According to the instructions that were received from the DM 228 via the NIP 232, an exemplary IRM 236 may transfer standard (non manipulated) received Iub blocks, as is, or reconstruct nonstandard Iub blocks into a standard format of an Iub block that matches the format of the original received Iub block. The reconstructed Iub block is sent toward the final destination via the IUAIF 217. The operation of the IRM 236 depends on the type of the session that is carried over the relevant channel. If the type of the session is unknown, the IRM 236 may transfer the Iub blocks, as is, to the IUAIF 217.

If the session is an audio session, an exemplary IRM 236 can be adapted to store the four bytes of the Iub header (H3; H2; H1 & H0) of the last reconstructed Iub block before it was transferred toward IUAIF 217. In addition IRM 236 can be capable of organizing an AMR audio frame according to the standard and adding padding bits between classes. In addition, the IRM 236 is adapted to calculate the CRC value of the header and put it as the first byte, H0, of the reconstructed Iub block; and to calculate the CRC of the reconstructed Iub block and place it in the last two bytes of the reconstructed Iub block.

In an audio session, per each received Iub block, the IRM 236 can be adapted to allocate space for the reconstructed Iub in the size that matches the bit rate that is used. In an exemplary embodiment of the present invention, the information on the bit rate can be sent by a mating DM 228. Yet, in another exemplary embodiment, the IRM 236 can be adapted to parse the four bits of the flag; and determine the number of bytes of the header that are associated with the received non-standard Iub block. The length of the audio data (classes A, B and C) is calculated and based on the length the audio data and a copy of table 1, which can be used by the IRM 236, the bit rate can be defined. The space can be in the SM 280, for example. Then, the flag with the first 4 bits that was created by its mating CRM 226 is parsed, in order to define which bytes of the original header were carried by the received nonstandard Iub block and accordingly, to define the location of each one of the class that are carried by the nonstandard Iub block. Parsing the flag can be based on the AMR bit rate that is currently used and on the nonstandard format that is used by the mating CRM 226 as it is disclosed above.

If the four bits of the flag are zero, indicating that the current Iub block does not carry any bytes of the original header, then the class A data is retrieved from the received nonstandard Iub block (the next 81 bits after the flag, for 12.2 Kbps bit rate for example, as it is disclosed above in conjunction with CRM 226) and is placed into the appropriate location in the allocated space for the reconstructed Iub block (5 bytes form the beginning of the reconstructed block) and seven padding bits are added. Then the class B data is retrieved from the received nonstandard Iub block (the next 103 bits, for 12.2 Kbps bit rate for example, as it is disclosed above in conjunction with the CRM 226) and is placed in the appropriate location in the allocated space for the reconstructed Iub block (after the seven padding bits), and one padding bit is added. Finally, the class C data is retrieved from the received nonstandard Iub block (the next 60 bits, for 12.2 Kbps bit rate for example) and is placed in the appropriate location in the allocated space for the reconstructed Iub block (after the padding bit).

After reconstructing the audio data (Class A, B & C with the padding bits) the stored second byte, H1, of the header of the previous Iub block is retrieved and the most significant seven bits are incremented by 1. The new value is placed as the second byte, H1, in the allocated space of the reconstructed Iub. The stored 3rd, 4th and 5th bytes, H2, H3 & H4, of the header of the previous Iub block are retrieved and are placed as the 3rd, 4th and 5th bytes in the allocated space of the reconstructed Iub. Then, a CRC value for the four bytes of the header, is calculated and stored in the location of H0.

After reconstructing the header of the audio Iub block and the audio data, the CRC of the reconstructed Iub is calculated and the two bytes of the CRC are stored at the tail of the reconstructed Iub. At this point the reconstructed Iub block is ready. The exemplary IRM 236 can store the last four bytes of the reconstructed Iub header (H1; H2; H3 & H4) of the current Iub instead of the previous one and a pointer to the stored reconstructed Iub block is transferred to a queue of IUAIF 217 to be processed into ATM cells and sent towards the final destination.

If the first bit of the flag is one, indicating that the current nonstandard Iub block carries the 2nd byte, H1, of the original header, then the class A data is retrieved from the received nonstandard Iub block (the 81 bits after the 12 bits of the flag and H1, for 12.2 Kbps bit rate for example, as it is disclosed above in conjunction with the nonstandard format that is used by exemplary CRM 226). The retrieved class A data is stored in the appropriate location in the allocated space of the reconstructed Iub block (5 bytes form the beginning of the reconstructed block) seven padding bits are added. Then the class B data is retrieved from the received nonstandard Iub block (the next 103 bits, for 12.2 Kbps bit rate for example) and is placed in the appropriate location in the allocated space for the reconstructed Iub block (after the seven padding bits), and ne padding bit is added. Finally, the class C data is retrieved from the received nonstandard Iub block (the next 60 bits, for 12.2 Kbps bit rate for example) and is placed in the appropriate location in the allocated space for the reconstructed Iub block (after the padding bit).

After reconstructing the audio data (Class A, B & C with the padding bits), the second byte, H1, of the header which is embedded within the received non standard Iub block, after the four bits of the flag, is retrieved and is stored as the second byte, H1, in the allocated space of the reconstructed Iub. Because the second bit of the flag is zero, the stored 3rd, 4th and 5th bytes, H2, H3 & H4, of the header of the previous Iub block are retrieved and are placed as the 3rd, 4th and 5th bytes in the allocated space of the reconstructed Iub.

After reconstructing the header of the audio Iub block, the CRC value of the header is calculated and is placed as the first byte, H0, in the allocated space of the reconstructed Iub. The CRC of the reconstructed Iub block is calculated and the two bytes of the CRC are stored at the tail of the reconstructed Iub. At this point the reconstructed Iub block is ready. The exemplary IRM 236 can store the last four bytes of the Iub header (H1; H2; H3 & H4) of the current Iub instead of the previous one and the reconstructed Iub block is transferred toward the final destination via IUAIF 217.

If the second bit of the flag is set to one, indicating that the current nonstandard Iub block carries the last three bytes (H2, H3, & H4) of the original header, then the class A data is retrieved from the received nonstandard Iub block (the 81 bits after the 28 bits of the flag and the last three bytes of the header, for 12.2 Kbps bit rate for example). The retrieved class A data is stored in the appropriate location in the allocated space for the reconstructed Iub block (5 bytes from the beginning of the reconstructed block) and seven padding bits are added. Then, the class B data is retrieved from the received nonstandard Iub block (the next 103 bits, for 12.2 Kbps bit rate for example) and is placed in the appropriate location in the allocated space for the reconstructed Iub block (after the seven padding bits), and one padding bit is added. Finally, the class C data is retrieved from the received nonstandard Iub block (the next 60 bits, for 12.2 Kbps bit rate for example) and is placed in the appropriate location in the allocated space for the reconstructed Iub block (after the padding bit).

Since the first bit of the flag is zero, the stored second byte, H1, of the header of the previous Iub block is retrieved and the most significant seven bits are incremented by one. The new value is placed as the second byte, H1, in the allocated space of the reconstructed Iub.

Since the second bit of the flag is set to a one, the last three bytes (H2, H3, & H4) of the header are embedded within the received nonstandard Iub block after the four bits of the flag. Therefore, the last three bytes (H2, H3, & H4) are retrieved from the received nonstandard Iub block and are stored as the last three bytes (H2, H3, & H4) in the allocated space of the reconstructed Iub. The CRC value the header is calculated and is placed as the first byte, H0, in the allocated space of the reconstructed Iub.

After reconstructing the header of the audio Iub block and the audio data, the CRC of the reconstructed Iub block is calculated and the two bytes of the CRC are stored at the tail of the reconstructed Iub. At this point the reconstructed Iub block is ready. The exemplary IRM 236 can save the last four bytes of the Iub header (H1; H2; H3 & H4) of the current Iub instead of the previous one and a pointer to the stored reconstructed Iub block is transferred to a queue of the IUAIF 217 to be processed into ATM cells and is sent toward the final destination.

If both bits, the 1st and the 2nd, are set to one, an exemplary IRM 236 may combine the above disclosed two cases, taking into account that the audio data in the nonstandard Iub block begins after 36 bits, the four bits of the flags plus the 32 bits of the last four bytes of the Iub header. The location of the last three bytes of the header is shifted a byte compared to the above disclosed case. The one byte shift is because H1 is embedded within the received nonstandard Iub block in front of H2; H3 & H4.

Nonstandard Iub block carrying audio session data compressed in AMR at a bit rate other than 12.2 Kbps can be reconstructed into a standard Iub block in a similar way as nonstandard Iub blocks carrying 12.2 Kbps (as it is disclosed above) using the parameters of the relevant bit rate. The parameters of the relevant bit rate can be found in table 1.

If the session is a video conferencing session, an exemplary IRM 236 can be adapted to store the second byte of the Iub header (H1) of the last Iub block, before it was transferred toward the IUAIF 217. The value of H1 of the previous Iub can be used for updating the sequence number, which is embedded within H1. The IRM 236 can receive, from the mating CAR 200, information on the session. The information can include the MC values that are currently used, the association between the MC and the media that is carried by the PDU, information on the bit rate of the audio data, etc. The information can be sent in band or out of band as it is disclosed above. In another exemplary embodiment of the present invention, the bit rate of the audio part of each received nonstandard Iub block can be extract from the length of its audio PDU. Based on the received information about the MC and the parsing of the second byte, H1, of the nonstandard Iub block, an exemplary IRM 236 can be capable of reconstructing the media PDUs as well as the other PDUs; adding flags between two consecutive PDUs; and adding padding information, if needed in order to reach the size of 163 bytes by adding an appropriate number of empty PDUs. In the uplink direction, the last two additional bytes are added in order to achieve the size of 167 bytes. In addition, the IRM 236 is adapted to calculate the CRC value of the reconstructed Iub block and place it as the last two bytes of the reconstructed Iub block.

In a video session per each received Iub block, the IRM 236 can be adapted to check the LSB (less significant bit) of the second byte, H1, of the header. If the LSB is false or zero, which indicates that the received Iub block is a standard one, a copy of the second byte of the header, H1, is stored instead of the previous one, and the received Iub blocked is transferred, as is, toward the final destination via the IUAIF 217. If the LSB is true or set to one, this indicates that the received Iub block is a nonstandard one (H1 is nonstandard), then an exemplary IRM 236 can allocate space for the reconstructed Iub. The space can be 165 bytes for downlink transportation or 167 for uplink transportation. The space can be allocated in the SM 280, for example. Then, the first byte (H0) and the 3rd byte (H2) of the received nonstandard Iub blocks are copied and stored in the allocated space for the reconstructed Iub in the location of the first (H0) and the 3rd (H2) bytes of the header of the reconstructed Iub block.

The most significant three bits of H1, the 8th, 7th, & 6$^{th}$ bits, are parsed in order to define the type and the media that is carried by the received nonstandard Iub block. For example, in a particular embodiment the 8th bit can reflect the inclusion of audio data. If the 8th bit is set to the value of one, it indicates that the first byte after H2 defines the length of the following chunk of bits and that the following chunks carry audio data. Similarly, the 7th bit can reflect the inclusion of video data. If the 7th bit is set to a value of one, it can indicates that the first byte after the first chunk (if one exists) of audio data defines the length of the second chunk and that the second chunks carry video data. Furthermore, the 6th bit can reflect the inclusion of one or more PDUs that carry other types of data Thus, if the 6th bit is set to a value of one, it indicates that the nonstandard Iub blocks also carry one or more PDUs of other types of data. Those other PDUs, with their separate flags, were copied as is into the nonstandard Iub block by the mating CRM 226, which is located on the other side of the bearer 126 (FIG. 1).

Based on the received information on the session (the MC), and the audio bit rate, the information that is parsed from the three MSBs (8th, 7th, & 6th) of H1, and the requirements from a standard Iub block that carries video conferencing information, an exemplary IRM 236 can reconstruct a nonstandard Iub block that will create a similar experience as the received original standard Iub block at the mating CAR 200 on the other side of bearer 126 (FIG. 1).

For a better understanding of the principles and conceptual aspects of the operation of an exemplary IRM 236, the following example of reconstructing a nonstandard Iub block that carries video conferencing data in the download direction is disclosed. In the example, the received information from the mating CAR 200 on the video session indicates that a multiplexing PDU is used and the value of the MC indicates that the media order in the PDU is audio followed by video data (A/V). From the three MSBs (8th, 7th, & 6th) of H1 of an exemplary nonstandard Iub block, the IRM 236 can conclude the type and the location of the data carried by the nonstandard Iub block. For the provided example, if the three MSBs (8th, 7th, & 6th) of H1 are set to one, this indicates that the current nonstandard Iub block carries, audio, video and other PDUs.

According to the above example, an exemplary IRM 236 can reconstruct a standard Iub block based on the received nonstandard Iub block. At the beginning, a decision is made on the bit rate of the audio. The decision can be based on the length of the payload of the audio PDU. Then, a string of media can be created according to the MC and the bit rate. The string of media will be embedded within a standard media PDU (A/V). The media string includes audio in 12.2 Kbps, followed by video (A/V). For creating the media string, the length of the audio data is retrieved from the byte that follows the three bytes (H0, H1, H2) of the header of the nonstandard Iub block. According to the length the following chunk of bits of the audio data is retrieved from the nonstandard Iub block. Padding bits are added, according to the bit rate, to separate between the classes (A,B,C) as it is disclosed above and the reconstructed audio string is added to the beginning of the media string.

The byte that follows the audio chunk in the nonstandard Iub block is retrieved in order to determine the length of the following video data chunk. According to the value of the retrieved byte, the following chunk of bits that carry the video data is retrieved and is placed after the reconstructed audio in the media string. A PDU header is calculated and added to the beginning of the media string. The PDU header has three bytes, one defining the MC, one indicating the length of the reconstructed PDU and one serving as a CRC value of the header. Then the reconstructed media PDU is stored in the allocated space for the reconstructed Iub after the last byte, H2, of the reconstructed Iub block. Two bytes of separating flags are added to the end of the media PDU in the allocated space for the reconstructed Iub. The separate flags can be configured by an administrator of the network 100 (FIG. 1).

The chunk of data that follows the video chunk in the received nonstandard Iub block is retrieved and is placed as is after the two byte separating flag in the allocated space for the reconstructed Iub. This chunk of data includes one or more PDUs that carry other types of data. If more than one PDU are included within this chunk, then the chunk also includes two bytes of separating flag between PDUs.

The 2nd byte, H1, of the Iub header can be reconstructed by replacing the three most significant bits (8th, 7th, & 6th) of the received nonstandard H1 with the three most significant bits (8th, 7th, & 6th) of the previously stored standard H1. Then the LSB of H1 is set to zero and the reconstructed H1 is placed in its location in the allocated space for the reconstructed Iub. One or more empty PDUs can be added, if needed, to the end of the reconstructed Iub block in order to get a length of 163 bytes. In the uplink direction, the additional two bytes can be copied from the received non-standard Iub block to the reconstructed one.

After reconstructing the header of the reconstructed Iub block and matching the length of the reconstructed content to 163 or 165 bytes, the two bytes of CRC of the reconstructed Iub are calculated and the two bytes of the CRC are stored at the tail of the allocated space of the reconstructed Iub. At this point the reconstructed video conferencing Iub block is ready. The exemplary IRM 236 can store the second bytes of the Iub header (H1) of the current Iub instead of the previous one, and a pointer to the stored reconstructed Iub block is transferred to a queue of the IUAIF 217 to be processed into ATM cells and will be sent toward the final destination. The CIR 230 can start processing the next Iub block that was transferred over the associated channel.

In other exemplary video conferencing sessions two values of the MC may be used thereby indicating that the audio and the video are carried in separate PDUs. The above reconstructing process can be slightly modified to accommodate this situation. For example, each media chunk can be handled separately and be placed in a separate PDU. The appropriate value of MC is written in the header of the PDU in order to reflect the type of media that is carried by the PDU. The two PDUs are placed as the media string, two bytes of separating flag are added in between to two PDUs in the media string.

Figure 3A:
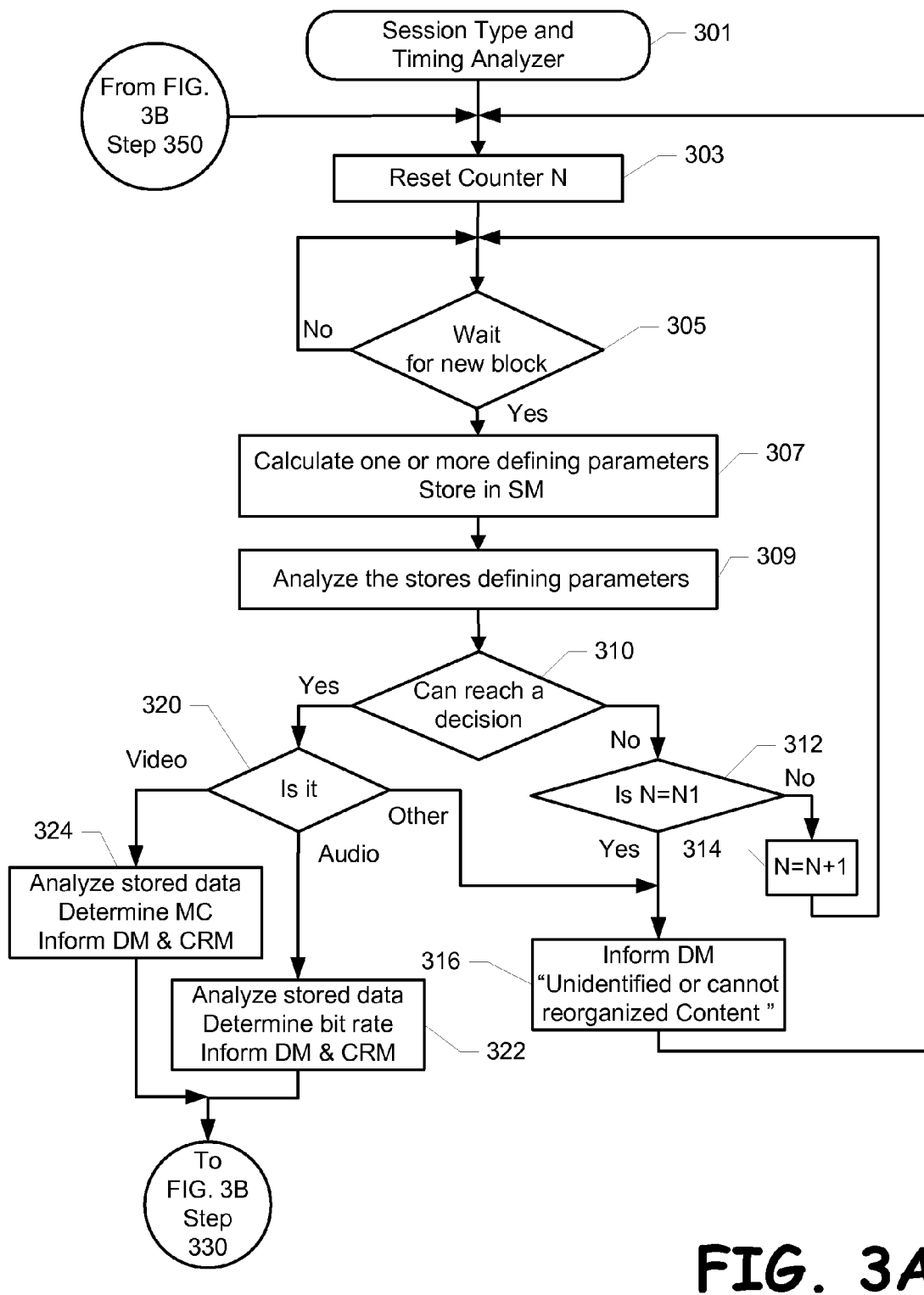
FIGS. 3A and 3B are flow diagrams showing relevant steps of an exemplary embodiment of a session type and timing analyzer task at an exemplary Connection Analyzer and Reorganizer.

FIG. 3A is a flow diagram illustrating the relevant steps of an exemplary process 300 that can be implemented by an exemplary session type and timing analyzer (STTA) 222 (FIG. 2). The process 300 can be implemented in order to analyze the type of the transportation that is traveling via an associated channel service improved module (CSIM) 220*a-c* (FIG. 2). An exemplary process 300 has 2 modes. During the first mode, an exemplary STTA 222 may analyze a few received Iub blocks in order to define the type of session that is currently being handled via an associated CSIM 220. The type of session can be a video conferencing session, an audio session or other type of sessions.

Figure 3B:
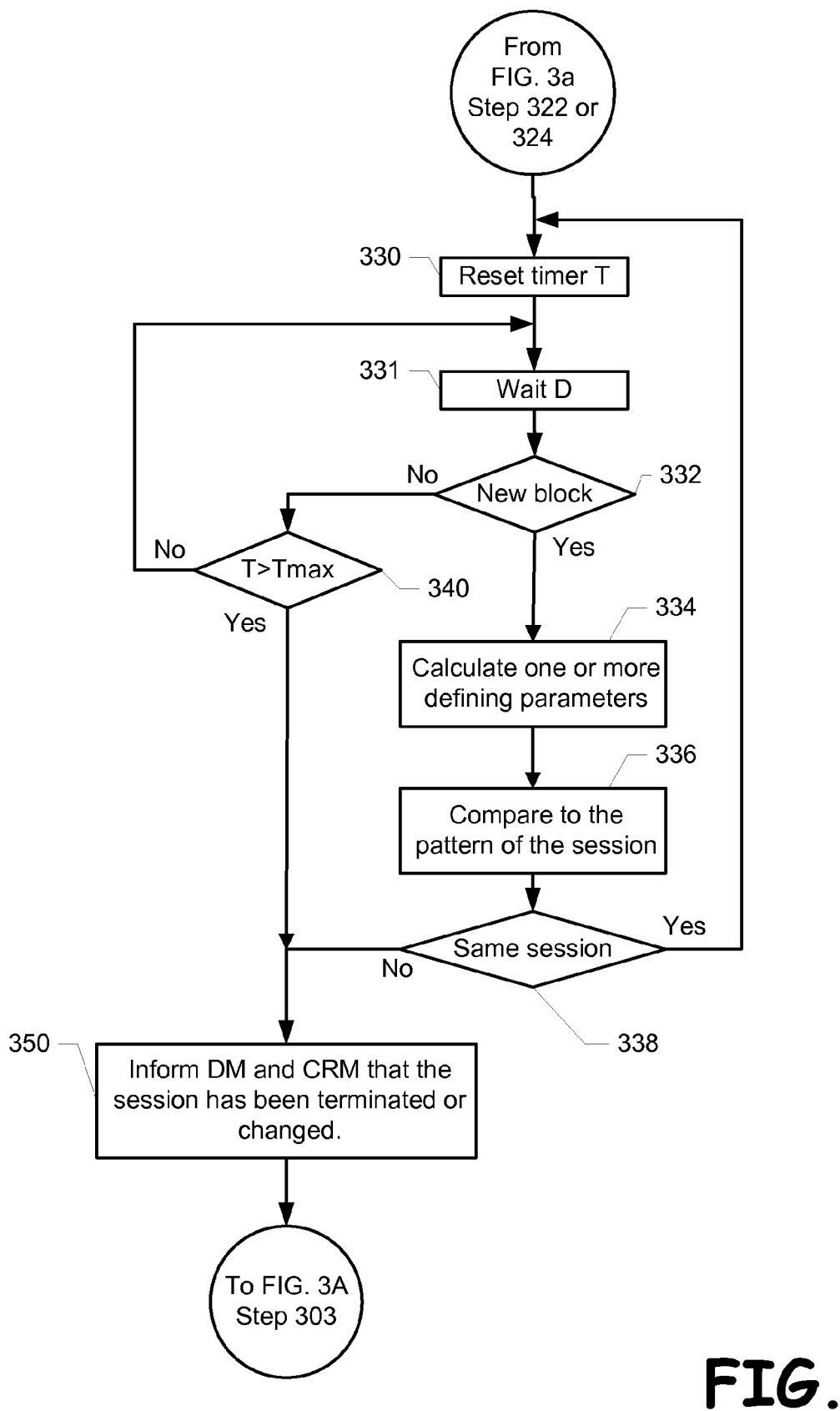

The second mode of operation, which is illustrated in FIG. 3B, is started after identifying the type of the session. During the second mode of operation, the process 300 may further observe the traffic over the channel in order to determine when a change in the session happens. The change can be a termination of the session or a new session that is currently transmitted via the associated channel.

The process 300 can be initiated 301 after establishing a new CSIM 220 and it may run in a loop as long as the associated CSIM is active. During initiation 301, STTA 222 can be informed about the addresses of relevant queues in the SM 280 (FIG. 2) that are needed for the operation of method 300, as well as the address of the relevant entry in a connection table. The connection table is a table that stores parameters that are relevant to the current session that is carried over the connection. Exemplary parameters can be written by STTA 222 during analyzing the session. Other parameters can be added by DM 228 when determines how to handle the session. The parameters can be read by CRM 226, DM 228 STTA 222, for example. Upon its initiation, a counter N is reset 303 and the process 300 may wait 305 until a pointer to a new Iub block is received. Upon receiving a new Iub block 305, one or more defining parameters that are relevant to the data transportation over the channel can be calculated 307. The calculated one or more defining parameter are stored 307 in a shared memory 280 (FIG. 2.). Exemplary defining parameters may include the rate, the number of bits that are included within the received Iub blocks etc. Those parameters can be used in order to define the type of content that is transferred over the relevant channel.

At step 309, the stored defining parameters are analyzed in order to determine whether the type of the session can be defined. A decision can be reached if there are enough Iub blocks that have a certain pattern, for example. If a decision regarding the type of the session that is currently carried by the associated channel cannot be reached 310, then it is determined whether the counter N is equal to N1 312. N1 is a configurable number of Iub blocks. It can be in the range of a few blocks, for example five to fifteen. If N is not equal to N1 312, then the process 300 may increment 314 the counter N by one and return to step 305 waiting for next Iub block.

If N is equal to N1 312, this means that exemplary process 300 cannot reach a decision regarding the type of content that is currently transmitted over the associated channel. At step 316, a field that is associated with the type of session in the relevant entry in the connection table can be updated indicating that the current session cannot be reorganized. In addition, a flag can be sent to the DM 228 and the CRM 226, the stored defining parameters of the previous Iub blocks (step 307) can be released and method 300 may return to step 303. The cycle can continue until a decision can be made.

If a decision on the type of session can be reached based on the stored defining parameters 310, then method 300 may further analyze the stored defining parameters in order to define the type of session. The LUT 224 (FIG. 2) can be searched for a match set of patterns and/or parameters that matches the stored defining parameters of the received Iub blocks. For example, it can be searched to determine if there are five or more consecutive Iub blocks that have a repetition rate of about 20 milliseconds, and their size is about 165 bytes for downlink direction or 167 bytes for uplink direction. In such a situation, a match set can be found in the LUT 224 (FIG. 2) and a decision can be made 320 that the traffic belongs to a video conferencing session.

In a similar way, if the length of the Iub block matches one of the length of an AMR compressed audio frame (as it is illustrated in table 1) and the repetition rate is about 20 milliseconds, then a decision can be made 320 that the Iub block belongs to an audio session, etc. If the session is an audio session 320, the analyzed stored data is further analyzed 322 in order to determine the bit rate of the compressed audio. A field in the relevant entry in the connection table can be updated 322 indicating that the session is an audio session and the field that is associated with the bit rate is updated too. In addition a flag can be sent to the DM 228 and the CRM 226 and method 300 proceeds to step 330 in FIG. 3B.

If the type of session is a video session 320, then a further analysis is performed to determine the multiplexing code (MC) that is used during the current session, the order of the media (A/V or V/A) and the compressed audio bit rate 324. An exemplary method for defining those parameters is disclosed above in conjunction with FIG. 2. A field in the relevant entry in the connection table can be updated 324 indicating that the session is a video session and the fields that are associated with the audio bit rate, MC, etc. are updated too. In addition, a flag can be sent to the DM 228 and the CRM 226. At this point of time, the first mode of the process 300 is ended and the second mode of operation is started at step 330 FIG. 3B. During the second mode, the traffic over the channel is observed in order to determine a change in the session. The second mode of operation is disclosed below in conjunction with the description of FIG. 3B.

During the second mode, which includes steps 330-350, an exemplary process 300 may continue observing or listening to the communication via the associated channel in order to determine a change in the session. The second mode can be initiated after transferring information to the DM 228 at step 322 or 324. Initially, a timer T is reset 330. The timer T is used to measure the elapsed period of time between two consecutive Iub blocks. After resetting the timer T, the process 300 may wait for a period D 331. The value of D may be on the order of a few milliseconds (five milliseconds, for example). Next, a check is performed to see if a new Iub block was received 332. If a new block was not received, a decision is made 340 whether the timer T is bigger then Tmax. Tmax is a parameter that can be configured by the administrator of the network and it is used to define the maximum period without traffic over a channel before making a decision that the session is terminated. Tmax can be in the range of a few hundreds of milliseconds, 400 msec for example.

If T is not greater then Tmax 340 then the process 300 returns to step 331. If T is greater then Tmax 340, then the process 300 may inform the DM 228 (FIG. 2) and/or the channel reorganizer module 226 that the session has been terminated or has been changed 350. Then the process 300 may return to step 303 to restart the first mode of operation for determining the type of a new session.

Returning now to step 332, if a new Iub block is received, then the Iub block is analyzed and one or more defining parameters are calculated 334. The calculated one or more defining parameters are compared to the pattern (defining parameters) of the session 336 which was defined during the first mode of method 300 and are stored in the relevant entry in the connection table. A decision is made whether it is the same session 338. If the defining parameters which were calculated at step 334 are at the same range as the defining parameters that were found at the first mode of the process 300, then it can be assumed that the session is from the same type and the process 300 returns to step 330 to reset the timer and then wait for the next Iub block.

However if 338 it was found that the defining parameters that were calculated at step 334 are different from the parameters that were calculated in the first mode, for example if the decided current session type is video conferencing and suddenly at step 334 the number of bits in the Iub block is other then 165 bytes for downlink direction or 167 bytes for uplink direction, then a decision can be made that the session is not the same and a change in the session occurs 338. In this situation, the process 300 may continue to step 350. At step 350, the relevant entry in the connection table can be updated indicating that the session is unknown and cannot be reorganized. In addition, a flag can be sent to the decision module 228 (FIG. 2) and/or the channel reorganizing module 226 informing them that the previous session has been terminated, the stored parameters can be released and method 300 may return to step 303 in FIG. 3A to check and analyze the channel looking for a beginning of a new session.

Figure 4:
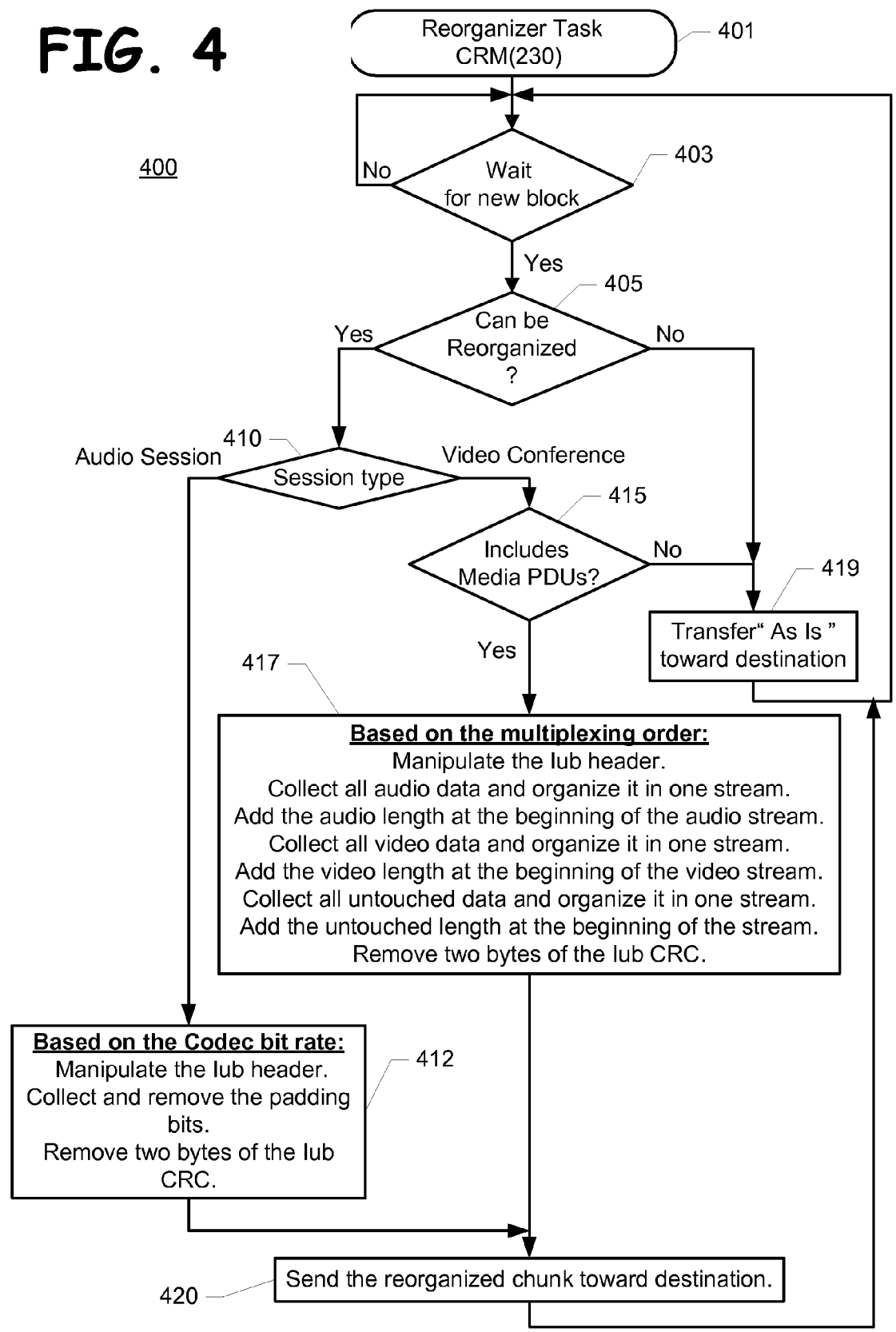
FIG. 4 is a flow diagram showing relevant steps of an exemplary embodiment of a reorganizer task at an exemplary Connection Analyzer and Reorganizer.

FIG. 4 is a flow diagram illustrating an exemplary process 400 for reorganizing Iub blocks in a nonstandard format. The process 400 can be implemented by a channel reorganizer module (CRM) 226 (FIG. 2). The process 400 can be initiated 401 as a branch of the initiation of a channel service improver module CSIM 220a-c. During initiation 401 CRM 226 can be informed about the addresses of relevant queues in SM 280 (FIG. 2) as well as the address of the relevant entry in the connection table. After initiation, the process 400 waits for receiving a pointer to a new Iub block stored in the input queue 403.

Upon receiving a pointer to an Iub block, the relevant entry in the connection table is retrieved and the field that is associated with the content of the session is parsed. According to the information that is stored in the field, a decision is made as to whether the Iub blocks of the current session can be reorganized into a nonstandard Iub block 405. If not, the received Iub block is transferred as is 419 toward the nonstandard Iu to ATM interface 213 FIG. 2. The pointer to the received Iub block can be stored in the queue of NSIuA 213 and process 400 may return to step 403 waiting for the next block.

However, if the session can be reorganized 405, then the relevant entry in the connection table is further parsed and a decision is made whether the session is a video conferencing session or an audio session 410. If the session is an audio session, the reorganizing process 412 can be initiated. The bit rate that is currently used is retrieved from the appropriate entry in the connection table. Based on the bit rate, the Iub header can be manipulated, padding bits that separate between the different classes and the two bytes of the Iub CRC can removed. In addition, a flag of four bits can be added to the beginning of the reorganized Iub block. More information about the reorganizing process is disclosed above in conjunction with FIG. 2. At the end of process 412 a pointer to the reorganized nonstandard Iub block is placed in the queue of NSIuA 213 to be sent toward its final destination 420.

Returning now to step 410, if the session is a video conferencing session, then the received Iub block is parsed and a decision is made whether the current received Iub block includes media PDUs and can be reorganized 415. The decision can be based on the MC value of each PDU. If the Iub block does not include media 415, the received Iub block is transferred as is toward the non standard Iu to ATM interface 213 FIG. 2 419. The pointer to the received Iub blocked can be stored in the queue of NSIuA 213. If the Iub block includes media PDUs and can be reorganized 415 then process 400 proceeds to step 417 and starts the reorganizing process of a video conferencing Iub block.

During the reorganizing process 417, the Iub headers are manipulated. The audio data is collected and organized in one stream. The length of the audio stream is added to the beginning of the audio stream. The video data is collected from all the PDUs that were included in the Iub blocks and it is organized into one video stream. The length of the video stream is calculated and the first byte with the length of the video stream is added to the beginning of the video stream. The video stream, with its length is attached to the end of the audio stream creating a single media steam. Later all untouched PDUs having information other then media are collected and copied as is in a single stream after the end of the video stream. Then the two bytes of the Iub CRC are removed. More information on the reorganizing process is disclosed above in conjunction with FIG. 2. At the end of process 417, a pointer to the reorganized nonstandard Iub block is placed in the queue of NSIuA 213 to be sent toward its final destination 420 and process 400 may return to step 403 waiting for the next Iub block.

FIG. 5 is a flow diagram illustrating an exemplary process 500 for reconstructing Iub blocks into a standard format. The process 500 can be implemented by a channel Iub reconstructing module (CIR) 230a-c (FIG. 2). The process 500 can be initiated as a branch of the initiation of a CIR 230a-c 501. During initiation CIR 220a-c can be informed about the addresses of relevant queues in SM 280 (FIG. 2) as well as the address of the relevant entry in the connection table that is associated with the current session 501. After initiation, the process 500 waits for receiving a pointer to a new block stored in the input queue 503.

Upon receiving a pointer to a new Iub block 503, the new block is retrieved and parsed by NIP 232. A decision is made 504 whether the received Iub block is a status Iub block. If the Iub block is a status Iub block, the status Iub block and the following received one or more Iub blocks (a configurable number) can be parsed 505. The information that is embedded within the status Iub blocks can include information that is required in order to reconstruct the following new Iub blocks. The information can be session type, the MC value, end of session, etc. The received information can be stored in the appropriate fields in the relevant entry in the connection table and an indication can be sent to IRM 236 (FIG. 2) 505. Then the process 500 returns to step 503 waiting for the next Iub block. In some exemplary embodiments of the present invention, an out of band connection can be used in order to carry the status information. In such embodiment steps 504 and 505 are not needed.

If the Iub block is not a status Iub block 504, the relevant entry in the connection table is retrieved and the field that is associated with the content of the session is parsed. Based at least in part on the information that is stored in the field, a decision is made whether the current session is media session 507. If the current session is not a media session, the received Iub block is transferred as is toward the Iub to ATM interface 217 FIG. 2 to be forward toward the final destination of the channel 516. The pointer to the received Iub blocked can be stored in the queue of the IuAIF 217 and the process 500 returns to step 503.

If the session is a media session 507, the relevant entry in the connection table is further analyzed in order to determine whether the session is an audio session or video session 510. If the session is an audio session 510, a reconstructing process of a nonstandard Iub block into a standard audio Iub block, which matches the appropriate bit rate, can be initiated 512.

The bit rate that is used can be defined based on the size of the audio chunk. The four bits of the flag in front of the header are parsed. Based on the bit rate and the four bits of the flag, the Iub header can be reconstructed. The CRC of the header is calculated and is placed as the first byte of the reconstructed Iub block. Padding bits that separate between the different classes can be added and the two bytes of the Iub CRC can be calculated and placed at the end of the reconstructed Iub block. More information about the reconstructing process of an audio non standard Iub block is disclosed above in conjunction with FIG. 2. At the end of process 512, a pointer to the reconstructed standard Iub block is placed in the queue of IuAIF 217 to be sent toward its destination 520 and process 500 returns to step 503 waiting to the next Iub block.

Returning now to step 510, if the session is a video conferencing session, then the second byte of the header of the received Iub block is parsed and a decision is made 514 as to whether the current received video Iub block is a nonstandard one. The decision can be based on the LSB of the second byte of the block. If the received Iub block is a standard Iub block it can be transferred as is toward the IuAIF 217 (FIG. 2) 516. The pointer to the received Iub block can be stored in the queue of the IuAIF 217. If the Iub block is a nonstandard Iub block, then process 400 proceeds to step 518 and starts the reconstructing process of a nonstandard video conferencing Iub block into a standard video Iub block.

During the reconstructing process of nonstandard video Iub block 518, information which is relevant to the reconstruction process is retrieved from the appropriate entry in the connection table. Information, such as but not limited to, the MC, the order of the media in a MUX PDU, etc. The bit rate of the audio can be defined based on the length of the audio chunk. Based on the retrieved information from the relevant entry in the connection table and parsing the second byte, H1, of the nonstandard Iub block, the media PDUs and the other PDUs are reconstructed. Separating flags between two consecutive PDUs are added. Then the value of the second byte (H1) of the header of the stored previous Iub block can be retrieved and be used for updating the sequence number. Padding bytes can be added, if needed, in order to reach the size of 163 bytes by adding an appropriate number of empty PDUs. In addition a CRC is calculated for the reconstructed Iub block and be placed as the last two bytes of the reconstructed Iub block. In the uplink direction, the last two additional bytes are added in order to achieve the size of 167 bytes. The last two bytes can be sent at the end of the non-standard Iub block. After adding the last two bytes, a CRC is calculated for the reconstructed Iub block and be placed as the last two bytes of the reconstructed Iub block. More information on the reconstructing process is disclosed above in conjunction with FIG. 2. At the end of process 518 a pointer to the reconstructed standard video Iub block is placed 520 in the queue of IuAIF 217 to be sent toward its destination.

In the present disclosure, the words "unit," "element," "module" and "logical module" can be used interchangeably. Anything designated as a unit or module can be a stand-alone unit or a specialized or integrated module. A unit or a module can be modular or have modular aspects allowing it to be easily removed and replaced with another similar unit or module. Each unit or module may be any one of, or any combination of, software, hardware, and/or firmware.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above described apparatus, systems and methods can be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims.

What is claimed is:

1. A method for providing an improved utilization of bandwidth over a connection carrying Iub blocks between a transmitting end and a receiving end of a bearer in a cellular fixed network, the method comprising steps of:
  receiving at the transmitting end a plurality of Iub blocks that are associated with the connection;
  examining one or more consecutively received Iub blocks to identify a type of content that is currently being transferred over the connection;
  defining one or more features of the content of the Iub blocks, wherein when the content of the communication is a video conferencing session, the defining is based on at least one feature of the content selected from a group consisting of: multiplexing code (MC), a bit rate value that is used for compressing received compressed audio data, and an order of audio data and video data within a multiplexing (MUX) protocol data unit (PDU);

reorganizing further received lub blocks into nonstandard lub blocks, based on identification of the type of the content, wherein the nonstandard lub blocks have less bits than the further received lub blocks; and transmitting the nonstandard lub blocks toward the receiving end.

2. The method of claim 1, wherein the step of reorganizing further received lub blocks further comprises reorganizing the further received lub blocks based at least in part on quality of service (QoS) criteria.

3. The method of claim 1, wherein the connection is based on an asynchronous transfer mode (ATM) protocol.

4. The method of claim 1, wherein the step of examining the one or more consecutively received lub blocks comprises analyzing a size of the lub blocks.

5. The method of claim 1, wherein the step of examining the one or more consecutively received lub blocks comprises analyzing a time between consecutive lub blocks.

6. The method of claim 1, wherein the step of examining the one or more consecutively received lub blocks comprises looking for a predefined combination of bytes in the lub blocks.

7. The method of claim 6, wherein the predefined combination of bytes is (0,0,128) at a beginning of a frame header of a compressed video based on compression standard H.263.

8. The method of claim 1, further comprising communicating the type of the content and the one or more features of the content to the receiving end.

9. The method of claim 8, wherein the step of communicating the type of the content and the one or more features of the content is done out of band.

10. The method of claim 8, wherein the step of communicating the type of the content and the one or more features of the content is done in band by using nonstandard status lub blocks.

11. The method of claim 1, wherein the step of reorganizing further received lub blocks includes removing CRC bytes.

12. The method of claim 1, wherein the step of reorganizing further received lub blocks includes manipulating one or more bytes of a header of the lub blocks.

13. The method of claim 1, wherein the step of reorganizing further received lub blocks includes at least one step selected from a group consisting of: removing one or more empty PDUs, and removing one or more separating flags between PDUs.

14. The method of claim 1, wherein the step of reorganizing further received lub blocks includes creating one PDU of video data and creating one PDU of audio data.

15. The method of claim 1, wherein the step of reorganizing further received lub blocks includes adding control information to each one of the nonstandard lub blocks, wherein the control information is used by the receiving end.

16. The method of claim 1, further comprising at the receiving end of the bearer:
 a. receiving the nonstandard lub blocks; and
 b. reconstructing the nonstandard lub blocks into standard lub blocks, wherein the standard lub blocks create similar experience at the receiving end as the lub blocks received at the transmitting end.

17. The method of claim 16, wherein the reconstructing is based on control information that is embedded within the nonstandard lub blocks.

18. The method of claim 16, further comprising receiving the type of the content and the one or more features of the content from the transmitting side.

19. The method of claim 16, wherein the reconstructing is based on the type of the content and the one or more features of the content.

* * * * *